US012384397B2

(12) United States Patent
Harel et al.

(10) Patent No.: US 12,384,397 B2
(45) Date of Patent: Aug. 12, 2025

(54) METHODS FOR HIGH OCCUPANCY VEHICLE LANE DISCIPLINE

(71) Applicant: Harman International Industries, Incorporated, Stamford, CT (US)

(72) Inventors: Jacob Harel, Redwood City, CA (US); Kirubasankar Madhaiyan, Karnataka (IN); Prasanna Kumar Bolisetty Yeswanth Naga, Karnataka (IN); Pradeep Anbumani, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 124 days.

(21) Appl. No.: 18/147,603

(22) Filed: Dec. 28, 2022

(65) Prior Publication Data
US 2024/0217532 A1 Jul. 4, 2024

(51) Int. Cl.
*B60W 50/14* (2020.01)
*B60W 30/18* (2012.01)
*B60W 40/04* (2006.01)
*H04W 4/44* (2018.01)

(52) U.S. Cl.
CPC ...... *B60W 50/14* (2013.01); *B60W 30/18163* (2013.01); *B60W 40/04* (2013.01); *H04W 4/44* (2018.02); *B60W 2050/146* (2013.01); *B60W 2300/00* (2013.01); *B60W 2540/049* (2020.02); *B60W 2554/406* (2020.02); *B60W 2556/50* (2020.02)

(58) Field of Classification Search
CPC .. B60N 2/002; B60N 2/0024; G01C 21/3676; G01C 21/3658; G01C 21/3438
See application file for complete search history.

(56) References Cited

U.S. PATENT DOCUMENTS

| 9,891,060 B2 | 2/2018 | Gaither |
| 10,240,937 B2 | 3/2019 | Chung et al. |
| 10,760,923 B2 | 9/2020 | Heo |
| 2010/0292916 A1* | 11/2010 | Kurciska ............ G01C 21/3453 701/533 |
| 2014/0032098 A1* | 1/2014 | Anderson .............. B60N 2/002 701/428 |
| 2017/0284814 A1* | 10/2017 | Gaither .............. G01C 21/3658 |

(Continued)

OTHER PUBLICATIONS

"RTCM Recommended Standards for Differential GNSS (Global Navigation Satellite Systems) Service," RTCM 10402.3, Version 2.3, Amendment 1, May 21, 2010, 194 pages.

(Continued)

*Primary Examiner* — Mirza F Alam
(74) *Attorney, Agent, or Firm* — McCoy Russell LLP

(57) ABSTRACT

The disclosure herein pertains to determining high occupancy vehicle (HOV) lane eligibility of a vehicle and position of the vehicle with respect to an HOV lane. A method for an on board unit (OBU) of a vehicle may include receiving a traveler information message (TIM) from a roadside unit (RSU), the TIM having a payload including codes indicating lane parameters and HOV criteria of an HOV lane. The OBU determines whether or not the vehicle is HOV lane-eligible and whether or not the vehicle is in the HOV lane, and outputs a corresponding notification.

20 Claims, 5 Drawing Sheets

(56) References Cited

U.S. PATENT DOCUMENTS

| | | | | |
|---|---|---|---|---|
| 2017/0328732 | A1* | 11/2017 | Vandanapu | B60N 2/002 |
| 2018/0266844 | A1* | 9/2018 | Heo | G01C 21/3461 |

OTHER PUBLICATIONS

"Surface Vehicle Standard—On-Board System Requirements for V2V Safety Communications," SAE International, vol. J2945/1, Mar. 2016, 127 pages.

"Surface Vehicle Recommended Practice—(R) Serial Control and Communications Heavy Duty Vehicle Network—Top Level Document," SAE International, vol. J1939, Aug. 2018, 29 pages.

"Standard Specification for Telecommunications and Information Exchange Between Roadside and Vehicle Systems ? 5-GHz Band Dedicated Short-Range Communications (DSRC), Medium Access Control (MAC), and Physical Layer (PHY) Specifications," ASTM International, vol. E2213-03R18, Sep. 12, 2018, 25 pages.

"Surface Vehicle Standard—Messages for Handling Strings and Look-up Tables in ATIS Standards," SAE International, vol. J2540, Jun. 2019, 41 pages.

"Surface Vehicle Standard—Converting ATIS Message Standards from ASN.1 to XML," SAE International, vol. J2630, Jun. 2019, 48 pages.

"Surface Vehicle Standard—Service Specific Permissions and Security Guidelines for Connected Vehicle Applications," SAE International, vol. J2945/5, Feb. 2020, 44 pages.

"Surface Vehicle Information Report—Candidate Improvements to Dedicated Short Range Communications (DSRC) Message Set Dictionary [SAE J2735] Using Systems Engineering Methods," SAE International, vol. J3067, Oct. 2020, 640 pages. (Submitted in 6 Parts).

"Surface Vehicle Standard—ITIS Phrase Lists (International Traveler Information Systems)," SAE International, vol. J2540-2, Dec. 2020, 177 pages.

"Surface Vehicle Standard—Requirements for Road Weather Applications," SAE International, vol. J2945/3, Jan. 2022, 87 pages.

"802.11b-1999—IEEE Standard for Information Technology—Telecommunications and information exchange between systems—Local and Metropolitan networks—Specific requirements—Part 11: Wireless LAN Medium Access Control (MAC) and Physical Layer (PHY) specifications: Higher Speed Physical Layer (PHY) Extension in the 2.4 GHz band," EEE Explore Website, Available Online at https://ieeexplore.ieee.org/document/817038, Jan. 20, 2000, 97 pages.

"NMEA 0183 Standard For Interfacing Marine Electronic Devices," National Marine Electronics Association, Version 3.01, Plaisance-Pratique Website, Available Online at https://www.plaisance-pratique.com/IMG/pdf/NMEA0183-2.pdf, Jan. 1, 2002, 92 pages.

"Information technology—Abstract Syntax Notation One (ASN. 1): Specification of basic notation ," International Telecommunication Union Website, Available Online at https://www.itu.int/ITU-T/studygroups/com17/languages/X.680-0207.pdf, Jul. 2002, 146 pages.

"Information technology—Abstract Syntax Notation One (ASN. 1): Parameterization of ASN. 1 specifications," International Telecommunication Union Website, Available Online at https://www.itu.int/ITU-T/studygroups/com17/languages/X.683-0207.pdf, Jul. 2002, 22 pages.

"Differential Gnss (Global Navigation Satellite Systems) Services—VERSION 3," RTCM Standard 10403.1, Developed By RTCM Special Committee No. 104, Oct. 27, 2006, 98 pages.

"Cooperative Intersection Collision Avoidance System Limited to Stop Sign and Traffic Signal Violations (CICAS-V)," Rosap Website, Available Online at https://rosap.ntl.bts.gov/view/dot/4143, Sep. 30, 2008, 95 pages.

"Information technology—Abstract Syntax Notation One (ASN. 1): Constraint specification," International Telecommunication Union Website, Available Online at https://www.itu.int/rec/dologin_pub.asp?lang=f&id=T-REC-X.680-200811-S !!PDF-E&type=items, Nov. 2008, 20 pages.

"1609.2-2016—IEEE Standard for Wireless Access in Vehicular Environments-Security Services for Applications and Management Messages," IEEE Explore Website, Available Online at https://ieeexplore.ieee.org/document/7426684, Mar. 1, 2016, 240 pages.

"1609.4-2016—IEEE Standard for Wireless Access in Vehicular Environments (WAVE)—Multi-Channel Operation," IEEE Explore Website, Available Online at https://ieeexplore.ieee.org/document/7435228, Mar. 21, 2016, 94 pages.

"1609.0-2019—IEEE Guide for Wireless Access in Vehicular Environments (WAVE) Architecture," IEEE Explore Website, Available Online at https://ieeexplore.ieee.org/document/8686445, Apr. 10, 2019, 106 pages.

"1609.3-2020—IEEE Standard for Wireless Access in Vehicular Environments (WAVE)—Networking Services," IEEE Explore Website, Available Online at https://ieeexplore.ieee.org/document/9374154, Mar. 9, 2021, 210 pages.

* cited by examiner

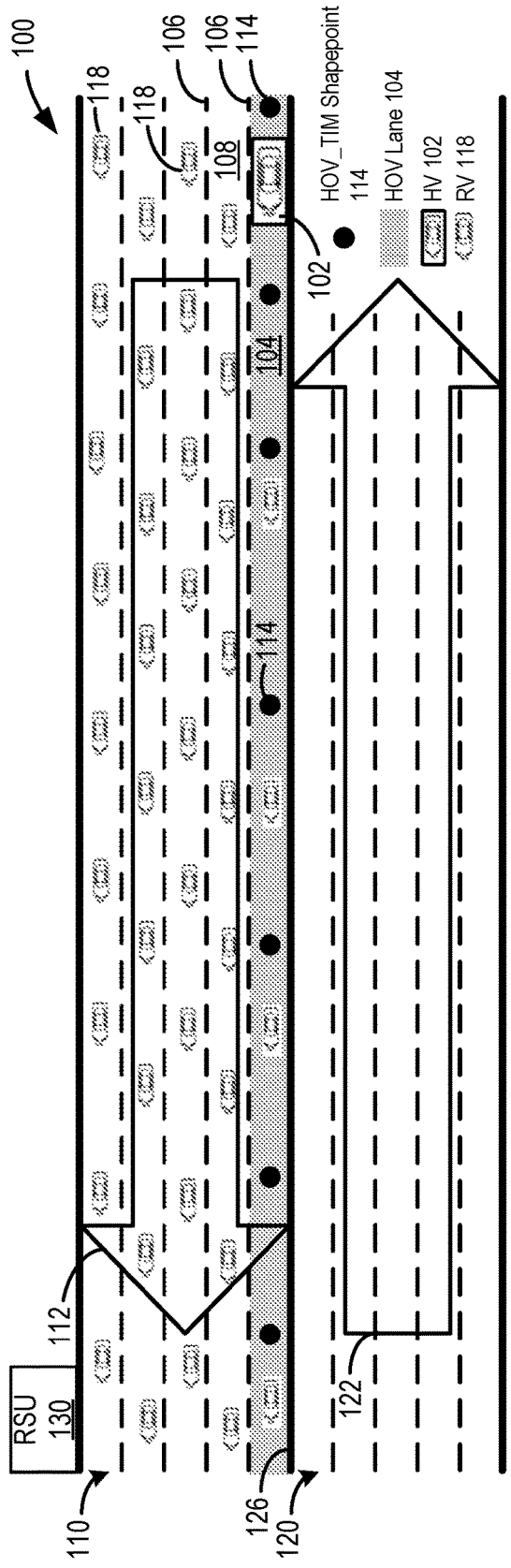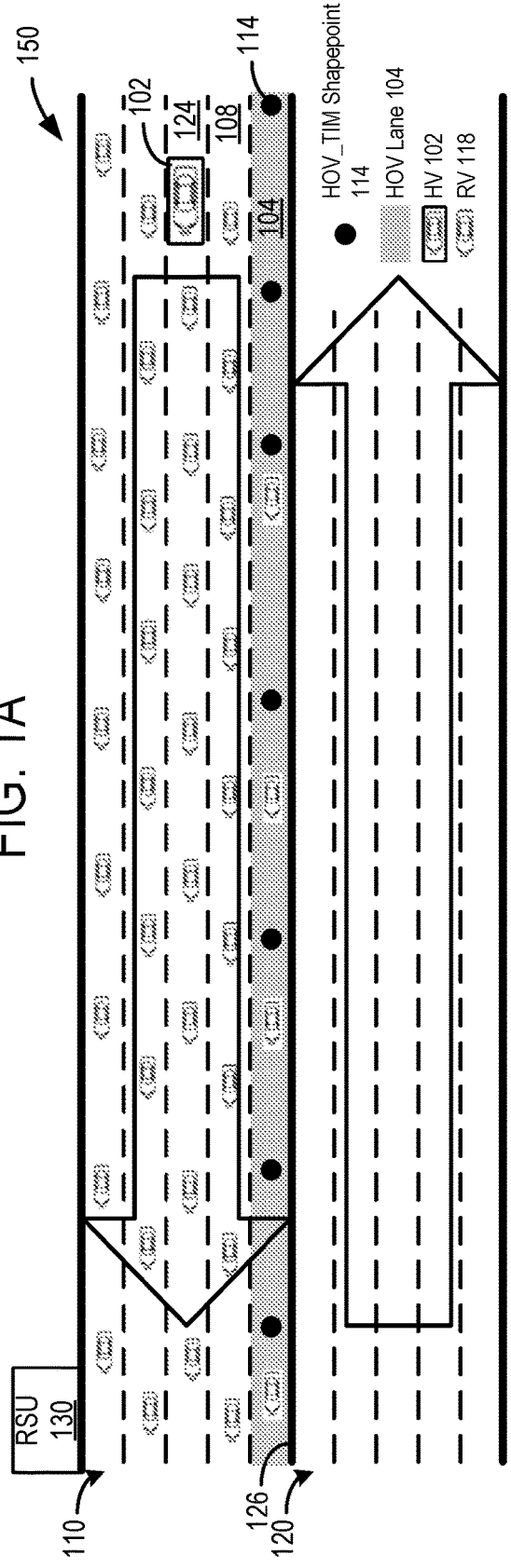

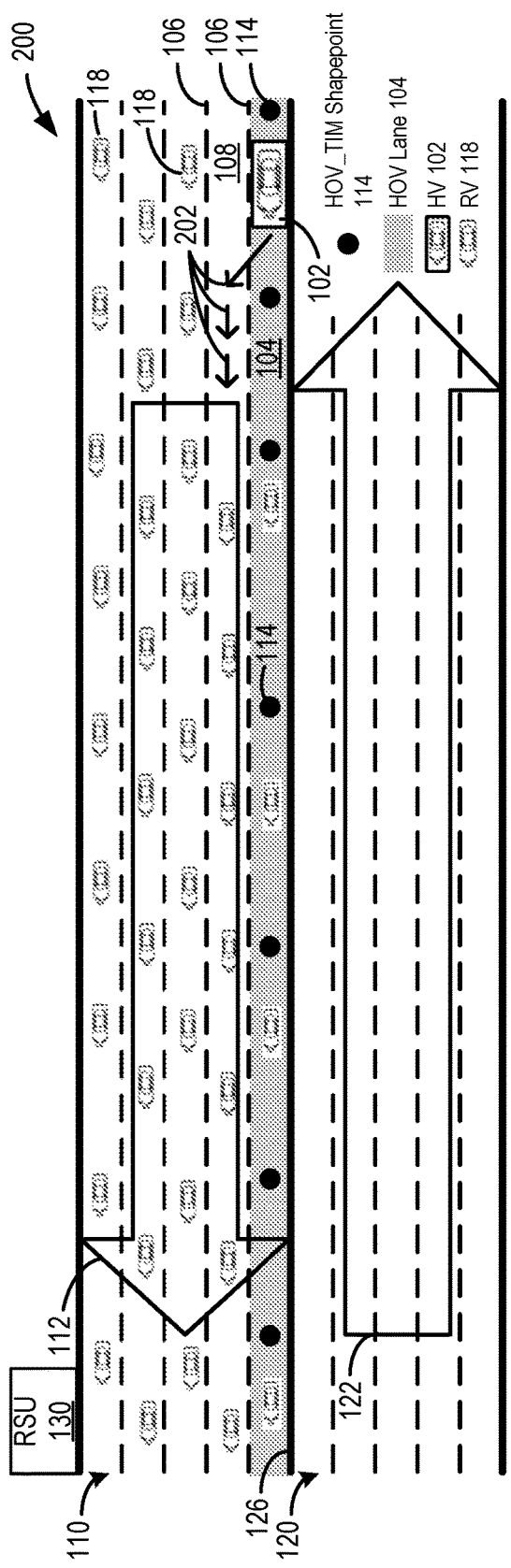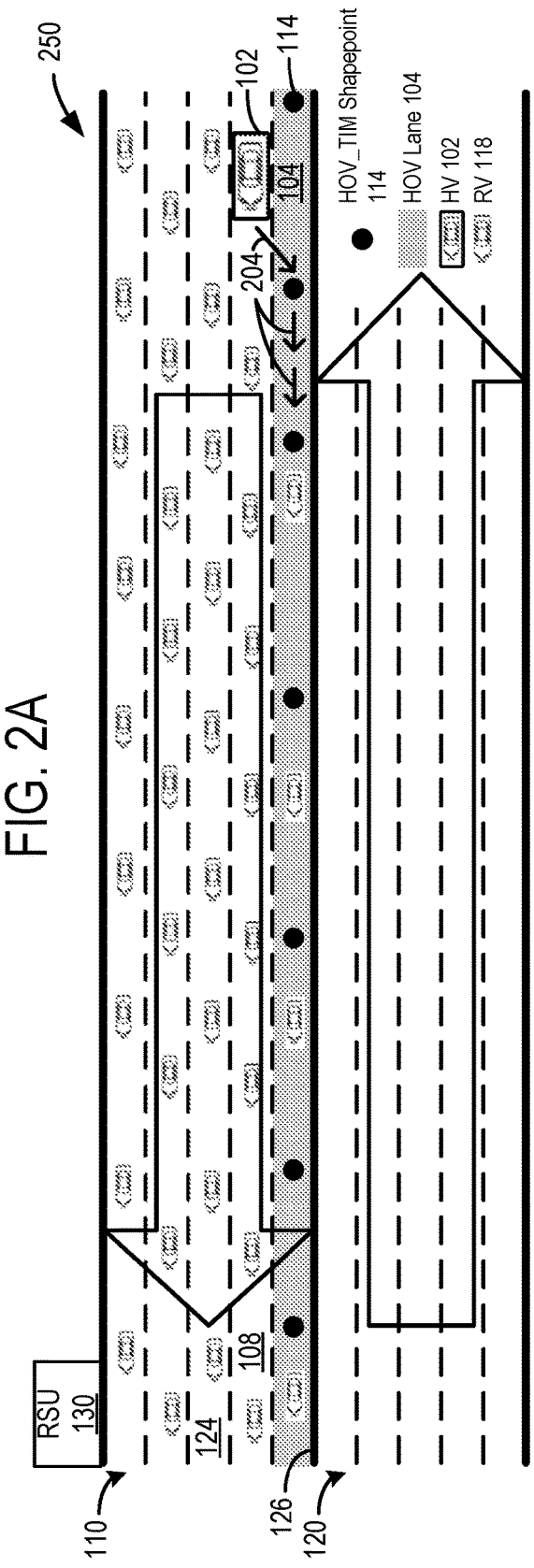
FIG. 2A
FIG. 2B

METHODS FOR HIGH OCCUPANCY VEHICLE LANE DISCIPLINE

FIELD

The disclosure relates to methods and apparatuses for detection and indication of a vehicle position in relation to a high occupancy vehicle (HOV) lane.

BACKGROUND

Vehicle-to-everything (V2X) communication is the process of broadcasting basic safety messages (BSM) from a vehicle to any V2X device that may affect the vehicle, and vice versa. V2X includes several types of communication, such as vehicle-to-infrastructure (V2I), vehicle-to-network, vehicle-to-vehicle, and vehicle-to-pedestrian. V2X communication allows for communication between the vehicle and other entities which may increase road safety, traffic efficiency, energy savings, avoidance of traffic violations, and minimization of ambiguities. V2I safety applications which are supported by a vehicle (e.g., an on board unit (OBU) of the vehicle) provide a driver of the vehicle with an early alert/warning based on configurable thresholds. The thresholds are predefined and developed through different pilot tests, different configuration, different user experiences, different vehicle capabilities, different terrains, different lanes, different regions, different vehicle classes, and so on. A host vehicle may trigger an early warning/alert (e.g., 5 seconds ahead of a collision/threat/violation) by indicating to the driver when a V2X remote vehicle dangerously approaches the host vehicle or when the host vehicle is about to violate traffic rules, for example.

In a typical V2X system, the host vehicle receives basic safety messages (BSM) from one or more remote vehicles (e.g., a car, truck, bus, and so on) and assess the threat based on the remote vehicle and host vehicle dynamics, such as speed, heading, latitude, longitude, elevation, yaw rate, acceleration CAN events, and other BSM information. The host vehicle may receive traveler information messages (TIMs), signal phase and timing (SPAT) messages, and map data (MAP) from one or more roadside units (RSU), and may assess possible traffic violations based on the received V2I messages.

Various V2I safety applications are derived based on host vehicle BSM and RSU V2I messages for purposes such as roadwork warning, curve speed warning, school zone warning, and so on. TIM messages are generated for an applicable region, zone, path, lane, set of lanes, and so on, where the TIM message also includes message validity (e.g., time of day, specific day, and so on), regulatory sign, applicable heading/direction, international traveler information systems (ITIS) code, or text information which are understandable by a V2X system. The V2X safety applications are defined and/or developed based on possible collision/violation scenarios in urban, rural, and highway roads. However, there remain some situations in highway driving which are yet to be addressed by a defined/developed safety application.

SUMMARY

In some situations, a vehicle may travel in a high occupancy vehicle (HOV) lane while the vehicle does not fulfill criteria of the HOV lane. The vehicle may consequentially receive a traffic citation. In other situations, the vehicle may not travel in the HOV lane while fulfilling criteria of the HOV lane. This may result in a longer travel time. When the vehicle has a driver, the driver may not realize an eligibility or ineligibility of the vehicle and, as a result, may not merge into the appropriate lane (e.g., into or out of the HOV lane). When the vehicle is ineligible to travel in the HOV lane yet is in the HOV lane, it is possible the vehicle may receive a citation for not adhering to the HOV lane criteria. When the vehicle is eligible to travel in the HOV lane and does not, a travel time of the vehicle to a destination may be unnecessarily increased compared to if the vehicle traveled in the HOV lane.

In some embodiments, the issues described above which relate to identification of HOV lane criteria and whether or not a vehicle fulfills the HOV lane criteria may be addressed by implementing a method or protocol in both the vehicle and a RSU which transmits roadside information to the vehicle. On the part of the RSU, the RSU may identify lane parameters and criteria of an HOV lane and generate a traveler information message (TIM) which includes the lane criteria and lane parameters for the HOV lane in a TIM payload. The RSU may output the TIM to be broadcast over a first region.

An on board unit (OBU) of the vehicle in the first region may receive and evaluate the TIM to extract the HOV lane criteria therefrom. The OBU may compare characteristics of the vehicle (e.g., stored in a basic safety message (BSM)) to the HOV lane criteria to determine if the vehicle is eligible to travel in the HOV lane (e.g., the characteristics of the vehicle fulfill the HOV lane criteria). For example, the BSM may include a vehicle class type and a number of occupants of the vehicle, where the number of occupants of the vehicle may be determined using one or more seat-mounted pressure sensors configured to measure the pressure applied to a seat of the vehicle to determine the presence of a user, and/or one or more seat-mounted clip-in sensors to detect when a first end of a belt is clipped into a belt receiver of a seat of the vehicle.

The OBU further determines if the vehicle is positioned in the HOV lane. When the OBU determines that the vehicle is not in the HOV lane and the vehicle is eligible to travel in the HOV lane, the OBU may generate and output a first message indicating that it may be desirable to move the vehicle to the HOV lane. When the OBU determines that the vehicle is in the HOV lane and the vehicle is not eligible to travel in the HOV lane, the OBU may generate and output a second message indicating it may be desirable to move the vehicle out of the HOV lane.

In one or more embodiments, a system for a vehicle configured to execute the above described method may comprise a user interface, an external device interface configured to wirelessly receive traveler information messages (TIMs) broadcast by a roadside unit (RSU), an on board unit (OBU) having one or more processors, and a non-transitory memory storing executable instructions that, when executed, cause the one or more processors to evaluate a TIM received by the system, determine if the vehicle is eligible to travel in an HOV lane by comparing characteristics of the vehicle to HOV lane criteria stored in the TIM, and determine a location of the vehicle relative to the HOV lane. In response to determining that the vehicle is HOV lane-ineligible and the vehicle is positioned in the HOV lane, the OBU generates and outputs a first notification, indicating that it may be desirable to move out of the HOV lane. In response to determining that the vehicle is HOV lane-eligible and the vehicle is not positioned in the HOV lane, the OBU generates and outputs a second notification, indicating that it may be desirable to move into the HOV lane.

In this way, an eligibility or ineligibility of a vehicle to travel in an HOV lane may be simply and quickly determined without ambiguity which may be present when HOV lane criteria are variable, for example, due to changes in traffic patterns, among different regions, and so on. The first notification may indicate when a vehicle is violating a traffic rule (e.g., traveling in the HOV lane while not qualifying to travel in the HOV lane). The first notification indicates it may be desirable to move out of the HOV lane, as not moving out of the HOV lane may result in a fine or citation. The second notification may indicate when a vehicle is not using a preferable lane (e.g., the HOV lane) for travel, as traveling in the HOV lane may result in a shorter travel time due to less vehicles being qualified to travel in the HOV lane compared to vehicles qualified to travel in non-HOV lanes. The methods and systems described herein may be implemented without additional interfaces or V2X message types to support the application. Further, the application modifies existing TIM payloads and uses existing defined standardized codes to generate the TIM payload. In this way, complexity of the system may not be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 1A shows a first scenario where a host vehicle (HV) is traveling in a high occupancy vehicle (HOV) lane, in accordance with one or more embodiments of the present disclosure;

FIG. 1B shows a second scenario where the HV is traveling in a non-HOV lane, in accordance with one or more embodiments of the present disclosure;

FIG. 2A shows a third scenario where the HV is traveling in the HOV lane and receives a notification indicating that it is desirable to move out of the HOV lane, in accordance with one or more embodiments of the present disclosure;

FIG. 2B shows a fourth scenario where the HV is traveling in a non-HOV lane and receives a notification indicating that it is desirable to move into the HOV lane, in accordance with one or more embodiments of the present disclosure;

DETAILED DESCRIPTION

Figure 3:
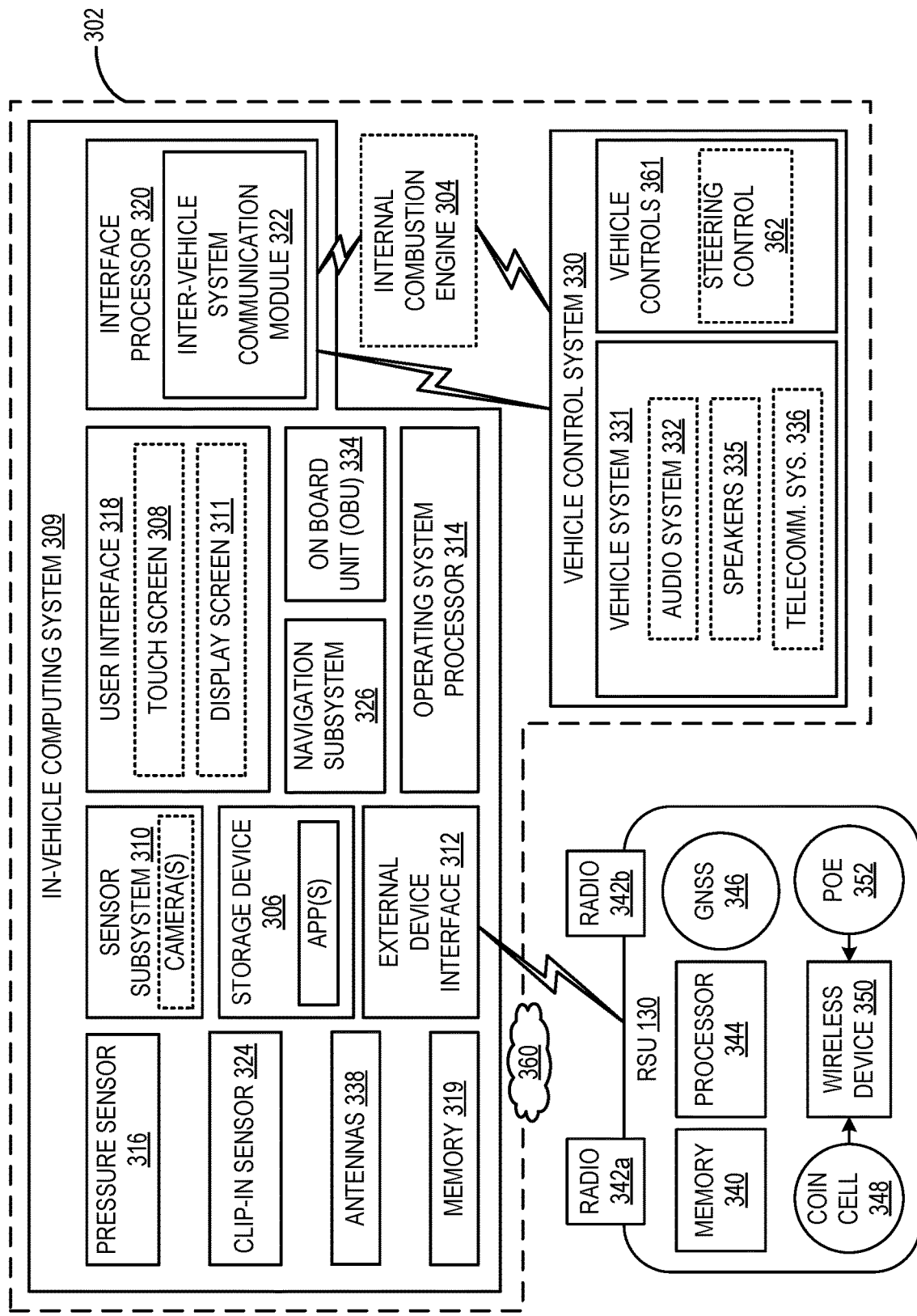
FIG. 3 shows a block diagram of an in-vehicle computing system configured and/or integrated inside the HV, in accordance with one or more embodiments of the present disclosure.

The following description relates to mechanisms and methods for vehicle lane management, and in particular, for determining an eligibility of a vehicle to travel in an HOV lane, comparing a position of the vehicle to a region of the HOV lane, and generating and outputting notifications which indicate that it is desirable to move into or out of the HOV lane.

FIG. 1A shows a first scenario 100 where a host vehicle (HV) is traveling in a high occupancy vehicle (HOV) lane. FIG. 1B shows a second scenario 150 where the HV is traveling in a non-HOV lane. Elements of FIGS. 1A and 1B are equivalent and are thus described herein using the same numbering schemes. FIGS. 1A and 1B are herein described simultaneously.

The first scenario 100 includes a roadway formed of a first series of lanes 110 and a second series of lanes 120. The first series of lanes 110 includes four non-HOV lanes and an HOV lane 104. For illustrative purposes, non-HOV lanes have a white background and the HOV lane 104 has a grey background. Each of the lanes of the first series of lanes 110 and the second series of lanes 120 are separated by dashed lines 106, for illustrative purposes. In reality, the dashed line 106 may be a dashed line, a solid line, a dashed white line, a solid white line, and/or any other type of line which differentiates between lanes and indicates merging from a first lane to a second lane may be allowed. In some examples, the dashed line 106 between the HOV lane 104 and a non-HOV lane directly adjacent to the HOV lane 104 may be different from the dashed line 106 between each of the non-HOV lanes. For example, the dashed line 106 between the HOV lane 104 and a first non-HOV lane 108 may be a dashed line, a solid line, a dashed yellow line, a solid yellow line, and/or any other type of line which is different from the dashed line 106 between non-HOV lanes. In some examples, the dashed line 106 between the HOV lane 104 and the first non-HOV lane 108 may be a wall and/or other structure which physically separates the HOV lane 104 and the first non-HOV lane 108, such as a series of cones positioned along a length of the dashed line 106. In examples where a structure physically separates the HOV lane 104 and the first non-HOV lane 108, there may be a gap in the structure along the length of the dashed line 106 in some regions to allow merging between the HOV lane 104 and the first non-HOV lane 108. The first series of lanes 110 has a first heading 112 (e.g., direction of travel).

A plurality of HOV_TIM shapepoints 114 are shown distributed along the length of the HOV lane 104. An HOV_TIM shapepoint 114 is a three-dimensional (3D) location indicating a location of the HOV lane 104. As briefly described above, a TIM may be broadcast by a RSU 130 and includes a payload with information about parameters and criteria of an HOV lane (e.g., the HOV lane 104). The TIM includes information regarding distribution of a plurality of HOV_TIM shapepoints 114. In some examples, the plurality of HOV_TIM shapepoints are distributed at regular intervals along the length of the HOV lane 104. For example, a plurality of HOV_TIM shapepoints 114 may be positioned at intervals of 6 m, 10 m, or any other distance interval, as indicated by the TIM payload. The TIM payload further includes a lane width which indicates a width of the HOV lane 104. For example, the lane width may be 6 m, greater than 6 m, or less than 6 m, depending on a type of roadway (e.g., freeway, highway, arterial road, et cetera). The TIM payload further includes information about a heading of the HOV lane (e.g., a direction of travel).

Together, the lane width, the plurality of HOV_TIM shapepoints 114, and the heading may be used to indicate boundaries of the HOV lane 104. For example, the TIM may have a range of 5 km which extends a 360-degree field of view from the RSU 130 broadcasting the TIM. In this way, the OBU of the vehicle may receive the TIM when entering the roadway and/or at any time when traveling in the range of the RSU. As further described with respect to FIG. 5, the OBU of the vehicle may evaluate the TIM to determine if the TIM payload includes information regarding an HOV lane. When it is determined that the TIM includes HOV lane information and, when characteristics of the vehicle are compared to the HOV lane information by the OBU and found to fulfill criteria of the HOV lane, a position of the vehicle with respect to the HOV lane may be determined. For example, an OBU of a vehicle traveling in the HOV lane 104 may detect that the vehicle is in the HOV lane 104 when the vehicle is positioned at the coordinates of an HOV_TIM shapepoint 114.

The second series of lanes 120 includes five lanes, which may or may not include an HOV lane. In the example shown in FIG. 1A, the five lanes of the second series of lanes 120 are non-HOV lanes. The second series of lanes 120 has a second heading 122 (e.g., direction of travel). In the example shown in FIG. 1A, the second heading 122 is opposite the first heading 112 (e.g., the first heading 112 is in a leftward direction and the second heading 122 is in a rightward direction). The first series of lanes 110 may be separated from the second series of lanes 120 by a barrier, such as a wall, cones, and/or painted line on the roadway indicating separate roadway areas. Separation of the first series of lanes 110 and the second series of lanes 120 is shown in FIGS. 1A and 1B as a solid line 126.

In examples other than those shown in FIGS. 1A and 1B, the second series of lanes 120 may have the same heading as the first series of lanes 110 (e.g., the first heading 112). For example, the second series of lanes 120 may be a roadway which has a variable heading depending on traffic flow and/or time of day. In other examples, the second series of lanes 120 may be a different road type compared to the first series of lanes 110. For example, the first series of lanes 110 may be a freeway and/or highway and the second series of lanes 110 may include at least one local and/or arterial road.

Returning to the first series of lanes 110, a plurality of remote vehicles (RV) are shown as traveling in the non-HOV lanes and the HOV lane 104. A RV 118 may be, for example, a vehicle with or without a driver. The plurality of RVs may be comprised of an assortment of vehicles, including passenger vehicles, trucks, buses, motorcycles, and so on.

FIG. 1A shows a HV 102 traveling in the HOV lane 104. As further described herein with respect to FIG. 5, the HV 102 may travel in the HOV lane 104 and it may be determined by the OBU that the HV 102 fulfills criteria of the HOV lane 104 indicated by the TIM received by the OBU. As a result, a notification may not be generated and output by an OBU of the HV 102, and the HV 102 may continue traveling in the HOV lane 104. Described another way, the HV 102 may be determined to be HOV lane-eligible. When the HV 102 is an autonomous vehicle or in an autonomous driving mode, vehicle controls of the HV 102 may direct the HV 102 to continue traveling in the HOV lane 104.

The HV 102 may be determined to be HOV lane-eligible and may travel in the HOV lane 104 in a plurality of scenarios, some of which are described herein. In a first example, a vehicle class type of the HV 102 may identify the HV 102 as a qualifying vehicle, where qualifying vehicles may be HOV lane-eligible regardless of the HOV lane criteria. For example, qualifying vehicles may include public utility vehicles such as emergency response vehicles (e.g., police, fire, ambulance, paratransit, et cetera), transit buses (e.g., school bus, local bus, express bus, et cetera), motorcycles, and/or electric vehicles. HOV lane criteria may not be imposed on qualifying vehicles. In some examples, some vehicle class types may be excluded from a list of qualifying vehicles. For example, a TIM may include a list of qualifying vehicles which includes transit buses but does not include electric vehicles. A TIM in a first region (e.g., first city, state, local, et cetera) may include electric vehicles on the list of qualifying vehicles and a TIM in a second region (e.g., second city, state, local, et cetera) may not include electric vehicles on the list of qualifying vehicles. A vehicle class type of the HV 102 may be stored as part of a basic safety message (BSM) in a memory of the HV 102, and the OBU of the HV 102 may compare the vehicle class type to the list of qualifying vehicles presented by a TIM. If the HV 102 is determined to be a qualifying vehicle, and the OBU detects that the HV 102 is in the HOV lane 104 (e.g., the HV 102 passes through coordinates of at least one HOV_TIM shapepoints 114) a notification may not be generated and output by the OBU, and the HV 102 may continue to travel in the HOV lane 104.

In a second example, the HV 102 may be directed to travel in the HOV lane 104 prior to beginning travel. For example, prior to departure, a destination may be input into a GPS of the HV 102 and a number of occupants of the HV 102 may be determined using at least one of a seat-mounted pressure sensor configured to measure the pressure applied to a seat of the vehicle to determine the presence of a user, and a seat-mounted clip-in sensor to detect when a first end of a belt is clipped into a belt receiver of a seat of the vehicle to determine the presence of a user. The OBU of the HV 102 may then identify HOV lanes and criteria thereof along potential routes from a present location of the HV 102 to the destination. For example, prior to departure, the HV 102 may be within the broadcast range of at least one RSU (e.g., the RSU 130), which broadcasts at least one TIM including information pertaining to an HOV lane (e.g., the HOV lane 104). The OBU of the HV 102 may compare the number of occupants and/or the vehicle class type of the HV 102 to HOV lane criteria, HOV lane heading (e.g., direction of travel), and time of travel to generate a potential route which may include the HOV lane 104, such that the HV 102 fulfills the HOV lane criteria during the time of travel.

In a third example, the HV 102 may be traveling in a non-HOV lane which then becomes the HOV lane 104. For example, a non-HOV lane may merge with the HOV lane 104 to become a single lane (e.g., the HOV lane 104). In another example, the non-HOV lane may become an HOV lane (e.g., the HOV lane 104) having HOV lane criteria due to a change in traffic patterns, time of day, and so on. The OBU of the HV 102 may compare vehicle characteristics of the HV 102 to the criteria of the HOV lane 104 throughout travel (e.g., including before the non-HOV lane becomes the HOV lane 104). When the non-HOV lane becomes the HOV lane 104, the OBU may detect that the HV 102 is in the HOV lane 104 when the HV 102 passes through coordinates of at least one HOV_TIM shapepoints 114. When the HV 102 is determined to be in the HOV lane 104, if the vehicle characteristics fulfill the criteria of the HOV lane 104, the HV 102 may continue traveling in the HOV lane 104 (e.g., may not merge to a non-HOV lane).

In this way, FIG. 1A shows example scenarios where the HV 102 is traveling in the HOV lane 104 and fulfills criteria of HOV lane 104. The HV 102 may therefore continue to travel in the HOV lane 104. The OBU of the HV 102 may not generate and output a notification indicating that a move out of the HOV lane 104 may be desirable, as further described with respect to FIGS. 2A-2B. Briefly, a notification indicating that it may be desirable to move out of the HOV lane 104 may be generated and output by the OBU of the HV 102 when the HV 102 is traveling the HOV lane 104 and vehicle characteristics of the HV 102 do not fulfill the criteria of the HOV lane 104. Further detail regarding attainment and comparison of criteria of the HOV lane 104 to vehicle characteristics is further described with respect to FIGS. 4 and 5.

FIG. 1B shows the HV 102 traveling in a second non-HOV lane 124. As further described herein with respect to FIG. 5, the HV 102 may travel in a non-HOV lane (e.g., the second non-HOV lane 124) and it may be determined by the OBU that the HV 102 does not fulfill criteria of the HOV lane indicated by the TIM received by the OBU. As a result, a notification may not be generated and output by an OBU of the HV 102, and the HV 102 may continue traveling in the first non-HOV lane 108. Described another way, the HV 102 may be determined to be HOV lane ineligible. When the HV 102 is an autonomous vehicle or in an autonomous driving mode, vehicle controls of the HV 102 may direct the HV 102 to continue traveling in the second non-HOV lane 124.

The HV 102 may be determined to be HOV lane-ineligible and may travel in the second non-HOV lane 124 in a plurality of scenarios, some of which are described herein. In a first example, the HV 102 may receive a TIM broadcast by the RSU 130, where the TIM payload contains criteria of the HOV lane 104. The OBU of the HV 102 may compare vehicle characteristics to the criteria of the HOV lane 104. For example, the vehicle characteristics may include a vehicle class type and/or a number of occupants. As further described with respect to FIG. 5, if it is determined that the vehicle characteristics of the HV 102 do not fulfill the criteria of the HOV lane 104, and the HV 102 is not traveling in the HOV lane 104 (e.g., the HV 102 does not pass through coordinates of at least one HOV_TIM shapepoints 114), a notification may not be generated and output by the OBU of the HV 102. The HV 102 may remain in the second non-HOV lane 124.

In a second example, the HV 102 may be directed to travel in the second non-HOV lane 124 prior to beginning travel. For example, prior to departure, a destination may be input into a GPS of the HV 102 and a number of occupants of the HV 102 may be determined using at least one of a seat-mounted pressure sensors and a seat-mounted clip-in sensor of the HV 102. The OBU of the HV 102 may then identify HOV lanes and criteria thereof along potential routes from a present location of the HV 102 to the destination. For example, prior to departure the HV 102 may be positioned within the broadcast range of the RSU 130 and may receive at least one TIM broadcast by the RSU 130. The OBU may extract information from a TIM including HOV lane parameters and criteria. The OBU may compare the vehicle characteristics (e.g., number of occupants and/or the vehicle class type of the HV 102) to HOV lane criteria and lane parameters (e.g., HOV lane heading (e.g., direction of travel), and time of travel) to generate a potential route which may include the HOV lane 104, such that the HV 102 fulfills the HOV lane criteria during the time of travel. If it is determined that vehicle characteristics of the HV 102 do not fulfill criteria for at least one HOV lane along potential routes to the destination, and/or that directing the HV 102 to an HOV lane for which the HV 102 is eligible may increase a travel time and/or decrease a fuel efficiency, the HV 102 may not be directed to a route having an HOV lane and the HV 102 may be directed to travel in non-HOV lanes (e.g., the second non-HOV lane 124).

In a third example, whether or not the HV 102 is eligible to travel in the HOV lane 104 may be determined while the HV 102 is traveling. As shown in FIG. 1B, the first non-HOV lane 108 may be positioned between the second non-HOV lane 124 and the HOV lane 104. A broadcast range of the RSU 130 may be such that the OBU of HV 102 receives the TIM even when the HV 102 is not in the HOV lane 104 (e.g., when the HV 102 is in the first non-HOV lane 108, the second non-HOV lane 124, and/or any of the non-HOV lanes of the first series of lanes 110). As further described with respect to FIG. 5, when the OBU receives the TIM, the OBU may compare vehicle characteristics of the HV 102 to the criteria of the HOV lane 104 to determine if the HV 102 is HOV lane-eligible. If it is determined that the vehicle characteristics do not fulfill the criteria of the HOV lane 104 (e.g., if the HV 102 is HOV lane-ineligible) and the HV 102 is not traveling in the HOV lane 104 (e.g., the HV 102 does not pass through coordinates of at least one HOV_TIM shapepoints 114), the HV 102 may continue traveling in the second non-HOV lane 124 and/or other non-HOV lanes, such as the first non-HOV lane 108 (e.g., the HV 102 may not merge to the HOV lane 104).

In this way, FIG. 1B shows example scenarios where the HV 102 is traveling in a non-HOV lane (e.g., the second non-HOV lane 124) and does not fulfill criteria of the HOV lane 104. The HV 102 may therefore travel in the second non-HOV lane 124 and/or any of the other non-HOV lanes of the first series of lanes 110. The OBU of the HV 102 may not generate and output a notification indicating that a move into the HOV lane 104 may be desirable, as further described with respect to FIGS. 2A-2B. Briefly, a notification indicating that it may be desirable to move into the HOV lane 104 may be generated and output by the OBU of the HV 102 when the HV 102 is traveling in a non-HOV lane (e.g., the first non-HOV lane 108, the second non-HOV lane 124) and vehicle characteristics of the HV 102 fulfill criteria of the HOV lane 104. Further detail regarding attainment and comparison of criteria of the HOV lane 104 to vehicle characteristics is further described with respect to FIGS. 4 and 5.

FIG. 2A shows a third scenario 200 where a HV is traveling in an HOV lane and an OBU of the HV generates and outputs a first notification indicating that it may be desirable to move out of the HOV lane. Described another way, the first notification indicates that the HV is HOV lane-ineligible. FIG. 2B shows a fourth scenario 250 where the HV is traveling in a non-HOV lane and receives a second notification indicating that it may be desirable to move into the HOV lane. Described another way, the second notification indicates that the HV is HOV lane-eligible. Elements of FIGS. 2A and 2B are equivalent to those described with respect to FIGS. 1A and 1B, and are thus described herein using the same numbering schemes.

FIG. 2A shows the HV 102 traveling in the HOV lane 104. As further described herein with respect to FIG. 5, the HV 102 may travel in the HOV lane 104 and the OBU of the HV 102 may determine that the HV 102 does not fulfill criteria of the HOV lane 104 indicated in the TIM payload. In response to the OBU determining that the HV 102 is in the HOV lane 104 (e.g., the HV 102 passes through coordinates of at least one of the plurality of HOV_TIM shapepoints 114) and the HV 102 does not fulfill criteria of the HOV lane 104, the OBU may generate and output the first notification indicating that it may be desirable to move out of the HOV lane 104. Described another way, the HV 102 may be determined to be HOV lane-ineligible, and it may be desirable to move out of the HOV lane 104 when traveling in the HOV lane 104 and not fulfilling the criteria of the HOV lane 104. When the HV 102 is an autonomous vehicle or in an autonomous driving mode, vehicle controls of the HV 102 may direct the HV 102 to merge out of the HOV lane 104.

The HV 102 may be determined to be HOV lane-ineligible when traveling in the HOV lane 104, and the first notification may be generated and output by the OBU to indicate that it may be desirable to move out of the HOV lane 104, in a plurality of scenarios, some of which are described herein. In a first example, the HV 102 may be traveling in a non-HOV lane which then becomes the HOV lane 104. For example, a non-HOV lane may merge with the HOV lane 104 to become a single lane (e.g., the HOV lane 104). In another example, the non-HOV lane may become an HOV lane (e.g., the HOV lane 104) having HOV lane criteria due to a change in traffic patterns, time of day, and so on.

The OBU of the HV 102 may compare vehicle characteristics of the HV 102 to the criteria of the HOV lane 104 throughout travel (e.g., including before the non-HOV lane becomes the HOV lane 104). When the non-HOV lane becomes the HOV lane 104, the OBU may detect that the HV 102 is in the HOV lane 104 when the HV 102 passes through coordinates of at least one HOV_TIM shapepoints 114. When the HV 102 is determined to be in the HOV lane 104, if the vehicle characteristics do not fulfill the criteria of the HOV lane 104, the OBU may determine that the HV 102 is HOV lane-ineligible, and may generate and output the first notification indicating that it may be desirable to move out of the HOV lane 104, as shown by the arrows 202.

In a second example, a number of occupants of the HV 102 may change during a multi-destination trip. The HV 102 may have a first number of occupants when traveling from an origin to a first destination via the HOV lane 104. When traveling from the origin to the first destination, the number of occupants may fulfill the criteria of the HOV lane 104. For example, the TIM may indicate a criterion of the HOV lane 104 as having at least three occupants of a vehicle. Upon reaching the first destination, at least one occupant may exit the HV 102, and the HV 102 may continue to travel to a second destination from the first destination with a second number of occupants, the second number of occupants less than the first number of occupants. The OBU may receive the TIM broadcast by the RSU 130, compare the vehicle characteristics, including the second number of occupants, to the criteria of the HOV lane 104 included in the TIM and determines if the HV 102 is HOV lane-eligible. While the first number of occupants may fulfill the criteria of the HOV lane 104, the second number of occupants may not fulfill the criteria of the HOV lane 104. The OBU of the HV 102 detects that the HV 102 is in the HOV lane 104 (e.g., the HV 102 passes through coordinates of at least one of the plurality of HOV_TIM shapepoints 114), however, as described above, the HV 102 having the second number of occupants is HOV lane-ineligible. Thus, the OBU may generate and output the first notification indicating that it may be desirable to move out of the HOV lane 104, as indicated by the plurality of arrows 202.

In a third example, criteria of the HOV lane 104 may change while the HV 102 is traveling in the HOV lane 104 and the vehicle characteristics of the HV 102 may no longer fulfil the criteria of the HOV lane 104. For example, due to a change in traffic patterns, time of day, and so on, a number of occupants requested by the criteria of the HOV lane 104 may change from two occupants to three occupants during rush hour traffic (e.g., when a number of vehicles on the road is greater than average for the day). The HV 102 may have two occupants and, when the criteria of the HOV lane 104 changes from two occupants to three occupants, the HV 102 may no longer be HOV lane-eligible. The OBU may receive a TIM with updated criteria for the HOV lane 104 (e.g., a change in the number of requested occupants per vehicle) and may compare the vehicle characteristics to the updated criteria. When the vehicle characteristics do not fulfill the criteria, and it is determined that the HV 102 is traveling in the HOV lane 104 (e.g., the HV 102 passes through coordinates of at least one of the plurality of HOV_TIM shapepoints 114) the OBU may generate and output the first notification indicating that it may be desirable to move out of the HOV lane 104, as indicated by the plurality of arrows 202.

In this way, FIG. 2A shows example scenarios where the HV 102 is traveling in an HOV lane (e.g., the HOV lane 104) and does not fulfill criteria of the HOV lane 104. The OBU of the HV 102 may therefore generate and output the first notification indicating that it may be desirable to move out of the HOV lane 104. Further detail regarding attainment and comparison of criteria of the HOV lane 104 to vehicle characteristics is further described with respect to FIGS. 4 and 5.

FIG. 2B shows the HV 102 traveling in the first non-HOV lane 108. As further described herein with respect to FIG. 5, the HV 102 may travel in a non-HOV lane (e.g., the first non-HOV lane 108) and the OBU of the HV 102 may determine that the HV 102 fulfills criteria of the HOV lane 104 indicated by the TIM payload. In response to the OBU determining that the HV 102 is not in the HOV lane 104 based on the HV 102 not passing through coordinates of an HOV_TIM shapepoint 114, (e.g., is in the first non-HOV lane 108) and the HV 102 fulfills criteria of the HOV lane 104, the OBU may generate and output the second notification indicating that it may be desirable to move into the HOV lane 104. Described another way, the HV 102 may be determined to be HOV lane-eligible, and it may be desirable to move into the HOV lane 104 when traveling in a non-HOV lane while fulfilling the criteria of the HOV lane 104. When the HV 102 is an autonomous vehicle or in an autonomous driving mode, vehicle controls of the HV 102 may direct the HV 102 to merge into the HOV lane 104.

The HV 102 may be traveling in a non-HOV lane (e.g., the first non-HOV lane 108) when it is determined that the vehicle characteristics fulfill the criteria of an HOV lane in the same series of lanes (e.g., the HOV lane 104 in the first series of lanes 110) in a plurality of scenarios, some of which are described herein. In a first example, vehicle characteristics of the HV 102 may change during the course of travel. The HV 102 may be traveling in the first non-HOV lane 108 and vehicle characteristics (e.g., vehicle class type and/or number of occupants) may not fulfill the criteria of the HOV lane 104. For example, a first number of occupants of the HV 102 may be one and the criteria of the HOV lane 104 may request at least two occupants for a vehicle to be HOV lane-eligible. The HV 102 may depart an origin with the first number of occupants and travel in the first non-HOV lane 108. The HV 102 may pick up additional occupants, such that the HV 102 has a second number of occupants, the second number of occupants greater than the first number of occupants. For example, the HV 102 may pick up two occupants such that the second number of occupants is three. The HV 102 may continue traveling in the first non-HOV lane 108 and may receive a TIM broadcast by the RSU 130 at regular intervals. The OBU of the HV 102 may compare vehicle characteristics, including the second number of occupants, to the criteria of the HV 102, as indicated by the TIM, and determine if the HV 102 is HOV lane-eligible. When the HV 102 is HOV lane-eligible, and it is determined by the OBU that the HV 102 is not in the HOV lane 104 (e.g., the HV 102 does not pass through coordinates of at least one of the plurality of HOV_TIM shapepoints 114) the OBU may generate and output the second notification indicating that it may be desirable to move into the HOV lane 104, as shown by the arrows 204.

In a second example, criteria of the HOV lane 104 may change while the HV 102 is traveling in the first non-HOV lane 108, and the vehicle characteristics of the HV 102 may newly fulfill the criteria of the HOV lane 104. For example, due to a change in traffic patterns, time of day, and so on, a number of occupants requested by the criteria of the HOV lane 104 may change from three occupants during rush hour traffic to two occupants for non-rush hour traffic (e.g., when a number of vehicles on the roadway is at or below average). In other examples, criteria of the HOV lane 104 may change during a time of day, regardless of traffic patterns. The HV 102 may have two occupants and be HOV lane-ineligible at a first time during a trip. The criteria of the HOV lane 104 may change during the trip of the HV 102. When the criteria of the HOV lane 104 changes from three occupants to two occupants, the HV 102 may become HOV lane-eligible. The OBU may receive a TIM including updated criteria for the HOV lane 104 (e.g., a change in the number of requested occupants per vehicle) and may compare the vehicle characteristics to the updated criteria. When the vehicle characteristics fulfill the criteria, and the OBU determines that the HV 102 is not in the HOV lane 104 (e.g., the HV 102 does not pass through coordinates of at least one of the plurality of HOV_TIM shapepoints 114) the OBU may generate and output the second notification indicating that it may be desirable to move into the HOV lane 104, as indicated by the plurality of arrows 204.

In this way, FIG. 2B shows example scenarios where the HV 102 is traveling in a non-HOV lane (e.g., the first non-HOV lane 108) and fulfills the criteria of the HOV lane 104. The OBU of the HV 102 may therefore generate and output the second notification indicating that it may be desirable to move into the HOV lane 104. Further detail regarding attainment and comparison of criteria of the HOV lane 104 to vehicle characteristics is further described with respect to FIGS. 4 and 5.

Figure 4:
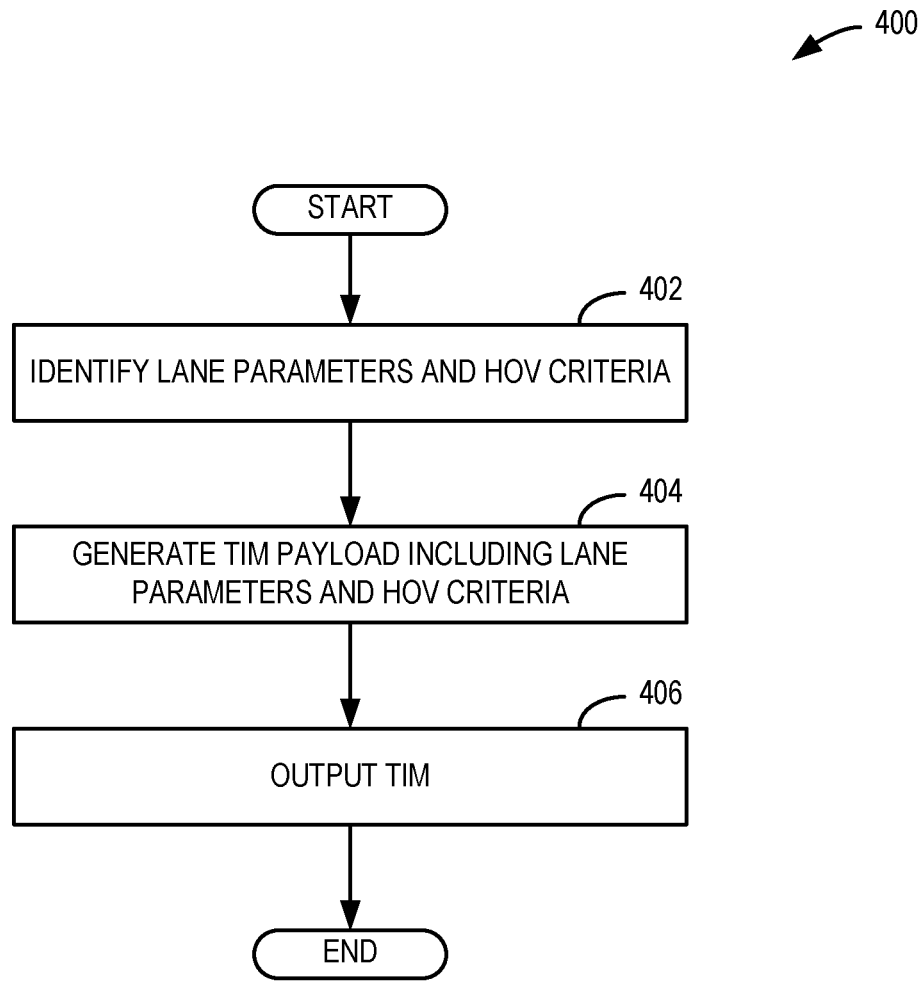
FIG. 4 shows a method for generating and broadcasting a traveler information message (TIM), in accordance with one or more embodiments of the present disclosure.
Figure 5:
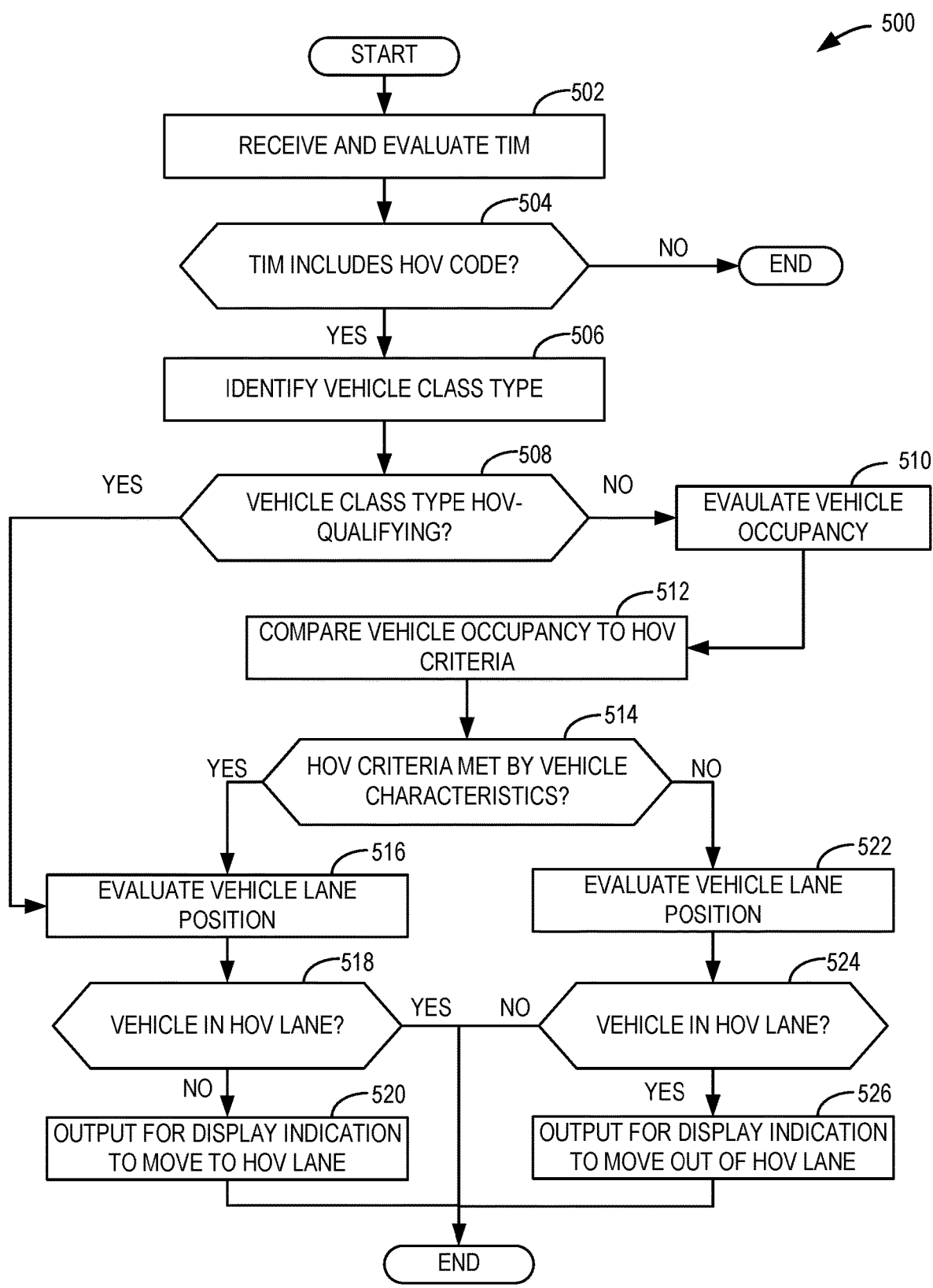
FIG. 5 shows a method for receiving and using information of the TIM to generate and output notifications indicating whether is it desirable to move into or out of an HOV lane, in accordance with one or more embodiments of the present disclosure.

For the scenarios described with respect to FIGS. 1A-2B, and as further discussed with respect to FIGS. 4 and 5, a method for generating and broadcasting a TIM may be implemented by a roadside unit (RSU), and a method for receiving the TIM and comparing vehicle characteristics to criteria of an HOV lane as indicated by the TIM to generate a notification regarding vehicle position with respect to the HOV lane may be implemented by a vehicle with an on board unit (OBU). In examples where the vehicle has a driver, and optionally in examples where the vehicle is autonomous, when the vehicle is not HOV-eligible and is traveling in the HOV lane, the OBU may generate the first notification indicating that it may be desirable to move out of the HOV lane. When vehicle is HOV-eligible and is not traveling in the HOV lane, the OBU may generate the second notification indicating that it may be desirable to move into the HOV lane. Each of the first notification and the second notification may include at least one of a light, sound, visual indicator, and/or other notification which may indicate a desirable motion of the vehicle (e.g., into or out of the HOV lane) to the driver. In some examples, the first notification and the second notification may be different (e.g., include different colored lights, different sounds, different visual indicators, et cetera). When the vehicle is autonomous or a vehicle in an autonomous mode, each of the first notification and the second notification may also include at least one of a light, sound, visual indicator, and/or other notification which may indicate a desirable motion of the vehicle to occupants of the vehicle. Additionally, vehicle controls of the vehicle may direct the vehicle to change lanes as indicated by the respective notification and based on additional spatial criteria, such as the lack of another vehicle within a range of the vehicle which is to merge. When the vehicle is in an appropriate lane (e.g., the vehicle is HOV lane-ineligible and is in a non-HOV lane, and when the vehicle is HOV lane-eligible and is in the HOV lane), no notification may be generated and/or output. Additionally, autonomous vehicles and/or vehicles in an autonomous mode may not move from the currently traveled in lane, pending fulfillment of additional criteria, such as lack of obstacles in the currently traveled in lane.

As briefly described with respect to FIGS. 1A-2B, a TIM which is received by an OBU of a vehicle (e.g., the HV 102) includes a payload containing information and criteria regarding an HOV lane. The TIM is broadcast from a roadside unit (e.g., RSU 130) to vehicles and other devices having an OBU, where the OBU is configured to evaluate the TIM and compare the criteria of the HOV lane to vehicle characteristics of the vehicle having the OBU.

The TIM includes a plurality of payload elements, including criteria and lane parameters for an HOV lane. In some examples, the plurality of payload elements may include codes which indicate different criteria for HOV lanes, as well as other lane parameters (e.g., roadway information). The codes may be standards for a region, city, county, country, continent, and so on. For example, international traveler information systems (ITIS) codes for "high occupancy vehicle plaque" as defined in SAE J2540/2 may be used in a TIM payload. In other examples, other region standards may be used. The codes may include an HOV lane indication (e.g., indicating the lane is an HOV lane), and at least one of a code indicating that single occupancy vehicles are HOV lane-ineligible, a code indicating vehicles with less than three occupants are HOV lane-ineligible, and a code indicating that vehicles with less than X number of occupants are HOV lane-ineligible, where X may be a configurable integer, as further described herein. A TIM may further include a list of qualifying vehicles which includes transit buses but does not include electric vehicles. For example, a TIM in a first region (e.g., first city, state, local, et cetera) may include electric vehicles on the list of qualifying vehicles and a TIM in a second region (e.g., second city, state, local, et cetera) may not include electric vehicles on the list of qualifying vehicles.

Lane parameters may describe characteristics of the HOV lane. A region type indicates a lane type. For example, the TIM may include a region type code which identifies the TIM as being for an HOV lane. As further described with respect to FIGS. 4 and 5, the region type may indicate to the OBU of a vehicle (e.g., the HV 102 of FIGS. 1A-2B) that a received TIM is a TIM for an HOV lane and the method of FIG. 5 may proceed. The criteria for the HOV lane further includes a heading of the HOV lane, which indicates a direction of vehicle travel. For example, as described with respect to FIG. 1A, the first set of lanes 110 has the first heading 112 and the second set of lanes 120 has the second heading 122. The heading of the HOV lane 104 is also the first heading 112. The criteria of the HOV lane includes a lane width, indicating a width of the HOV lane. Additionally, the criteria for the HOV lane includes a validity time duration which indicates when the criteria are in effect. For example, the criteria for the HOV lane may be in effect on specific days (e.g., Sunday or Monday through Friday), at a specific time of day (e.g., rush hour, such as 6 a.m. to 9 a.m.), and/or throughout the year (e.g., different criteria for different months and/or seasons).

The TIM payload is further used to identify and differentiate the HOV lane from non-HOV lanes and, in some examples, from other HOV lanes. As described above, a shapepoint (e.g., of the HOV_TIM shapepoints 114 of FIGS. 1A-2B) is a 3D location of a node in an HOV lane (e.g., the HOV lane 104). Coordinates of each shapepoint are stored in the TIM payload. A plurality of shapepoints may be evenly distributed along a length of a respective HOV lane, in some examples. In other examples, each shapepoint may be positioned a chosen distance from a preceding and a following shapepoint along the length of the respective HOV lane. The chosen distance may be chosen by a roadway designer and based on local, regional, and/or national standards. For example, the plurality of shapepoints may be distributed using ITIS codes, such as distance=shapepointset/offsetXY. In another example, the plurality of shapepoints may be positioned at a configurable frequency. For example, each of the plurality of shapepoints may be positioned at intervals of 6 m, 10 m, or any other distance interval less than 5 km apart, and a distance between at least some of the shapepoints may change. For example, shapepoints may be closer together in regions where the HOV lane curves and/or has other size/shape characteristics which may be different from an approximately 180-degree linear roadway. In this way, a maximum distance (e.g., along the length of the respective HOV lane) may be covered by one TIM. Described another way, at least one TIM may define a plurality of shapepoints along the length of the respective HOV lane.

A TIM may be broadcast over a configurable distance and/or range. For example, a first TIM may be broadcast over, and thus received by OBUs within, a 5 km radius extending from the RSU which is broadcasting the first TIM. A second TIM may be broadcast over a larger, smaller, or equal distance and/or range, such that a range of the first TIM and a range of the second TIM may at least partially overlap. In some examples, the range of the first TIM and the range of the second TIM may not overlap and instead the range of the second TIM may begin where the range of the first TIM ends.

As further described with respect to FIG. 5, an OBU of a vehicle may receive a TIM when entering a roadway (e.g., the first set of lanes 110 of FIGS. 1A-2B). The TIM may additionally or alternatively be received by the OBU through cloud services, such as 5G, 4G, and/or equivalent communication technologies, when entering or prior to entering the roadway. As described above, the TIM payload includes criteria for an HOV lane, including a plurality of shapepoints and coordinates thereof. When an OBU of a vehicle determines that the vehicle is at the coordinates of the shapepoint indicated by the TIM, the vehicle is understood to be in the HOV lane indicated by the TIM.

Systems and methods described herein for determining vehicle HOV lane-eligibility and vehicle position with respect to the HOV lane may be implemented in a system which includes a vehicle and an external device communicably coupled thereto, an example of which is shown in FIG. 3. An in-vehicle computing system 309 may be configured for and/or integrated inside a vehicle 302, and includes an OBU 334 for processing TIMs received by the vehicle 302. The vehicle 302 may be an example of the HV 102 of FIGS. 1A-2B. Vehicle 302 may be a motor vehicle including drive wheels (not shown) and an internal combustion engine 304. Internal combustion engine 304 may include one or more combustion chambers which may receive intake air via an intake passage and exhaust combustion gases via an exhaust passage. Vehicle 302 may be a road automobile, among other types of vehicles. In some examples, vehicle 302 may include a hybrid propulsion system including an energy conversion device operable to absorb energy from vehicle motion and/or the engine and convert the absorbed energy to an energy form suitable for storage by an energy storage device. Vehicle 302 may include a fully electric vehicle, incorporating fuel cells, solar energy capturing elements, and/or other energy storage systems for powering the vehicle.

The vehicle 302 may include one or more seat-mounted pressure sensors 316 configured to measure the pressure applied to a seat of the vehicle 302 to determine the presence of a user, and/or one or more seat-mounted clip-in sensors 324 to detect when a first end of a belt is clipped into a belt receiver of a seat of the vehicle 302 to determine the presence of a user. The vehicle 302 may further include door sensors configured to monitor door activity, humidity sensors to measure the humidity content of the cabin, microphones to receive user input in the form of voice commands, to enable a user to conduct telephone calls, and/or to measure ambient noise, and so on. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, and so on. Information regarding ambient conditions of the vehicle, vehicle status, or vehicle driver may also be received from sensors external to/separate from the vehicle (that is, not part of the vehicle system).

An instrument panel may include various displays and controls accessible to a driver (also referred to as the user) of vehicle 302. For example, an instrument panel may include a user interface 318 which may be used by a user to control one or more elements of in-vehicle computing system 309. User interface 318 may include a graphical user interface presented on a touch screen, such as a touch screen 308 and/or display screen 311, and/or user-actuated buttons, switches, knobs, dials, sliders, and so on. Touch screen 308 may receive user input to in-vehicle computing system 309 for controlling audio output, visual display output, user preferences, control parameter selection, and so on. In some embodiments, one or more hardware elements of in-vehicle computing system 309, such as touch screen 308, display screen 311, various control dials, knobs and buttons, memory, processor(s), and any interface elements (e.g., connectors or ports) may form an integrated head unit that is installed in an instrument panel of the vehicle.

A user may also interact with one or more applications of in-vehicle computing system 309 via user interface 318. In addition to receiving a user's vehicle setting preferences on user interface 318, vehicle settings selected by in-vehicle control system 330 may be displayed to a user on user interface 318. Notifications and other messages (e.g., received messages), as well as navigational assistance, may be displayed on a display of the user interface. User preferences/information and/or responses to presented messages may be performed via user input to the user interface. For example, as described above and further described with respect to FIGS. 4 and 5, a first notification indicating that it may be desirable to move out of an HOV lane and a second notification indicating that it may be desirable to move into an HOV lane may be displayed on a display (e.g., the touch screen 308, the display screen 311) of the user interface 318.

In-vehicle computing system 309 may perform one or more of the methods described herein in some embodiments. In some examples, in-vehicle computing system 309 may be a vehicle infotainment system configured to provide information-based media content (audio and/or visual media content, including entertainment content, navigational services, and so on) to a vehicle user to enhance the operator's in-vehicle experience. In-vehicle computing system 309 may include, or be coupled to, various vehicle systems, sub-systems, hardware components, as well as software applications and systems that are integrated in, or integratable into, vehicle 302 in order to enhance an in-vehicle experience for a driver and/or at least one occupant.

In-vehicle computing system 309 may include one or more processors including an operating system processor 314 and an interface processor 320. Operating system processor 314 may execute an operating system on in-vehicle computing system 309, and control input/output, display, playback, and other operations of in-vehicle computing system 309. Interface processor 320 may interface with a vehicle control system 330 via an inter-vehicle system communication module 322.

In-vehicle computing system 309 may be communicatively coupled to an external device configured to provide input to the in-vehicle computing system 309. For example, the external device may be the RSU 130 of FIGS. 1A-2B. The RSU 130 includes at least one wireless device 350 for signal broadcasting, one or more processors 344, a wireless interface for sending transmissions to OBUs, and a non-transitory memory 340 having executable instructions that, when executed, cause the one or more processors to detect parameters of a lane, generate, in response to detection of parameters of the lane, a traveler information message (TIM) having a payload which indicates the parameters of the lane, and broadcast the TIM over a wireless interface. Further detail regarding TIM generation and output is described with respect to FIG. 4.

The RSU 130 may facilitate communication between transportation infrastructure and OBUs of vehicles (e.g., the vehicle 302) by exchanging V2X safety messages (e.g., at least one TIM) over a wireless communication medium, which may include Wi-Fi DSRC protocol compliant mediums, cellular-V2X protocol (e.g., 4G) compliant mediums, and 5G protocol compliant mediums, in compliance with automotive standards and region specific standards.

The RSU 130 may be integrated with a backhaul system, which may enable remote management (e.g., operation and maintenance) of the RSU 130, and may provide RSU services and/or applications delivered by back office service providers to vehicles and other devices (e.g., devices configured with an OBU capable of communication with at least one RSU). Additionally, RSU 130 may be incorporated with local traffic control systems (e.g., an intersection traffic controller) to deliver traffic management services to vehicles and/or other mobile devices configured with an OBU.

The RSU 130 may be configured with a first radio 342a and a second radio 342b. The first radio 342a and the second radio 342b may broadcast signals generated by the RSU 130 via DSRC/CV2X. In one example, a broadcasting range may include a 360-degree field of view and a long range detection and/or communication capability of up to 1000 meters. The first radio 342a and the second radio 342b may be radio interfaces configured with over-the-air (OTA) transmission and receiving capabilities for wireless signals (e.g., OTA transmitting and/or receiving interfaces). The first radio 342a and the second radio 342b may have different broadcasting capabilities such that different RSU messages such as WSA messages, TIM messages, SPaT messages, MAP messages, and so on may be configured to broadcast in a specific radio or antenna. For example, the first radio 342a may be a radio used for broadcasting WSA and TIM messages (e.g., using a first V2X channel), and the second radio 342b may be used for additional services, for example, SPaT messages, MAP messages, and so on (e.g., using a second V2X channel).

The RSU 130 is further configured with a global navigation satellite system (GNSS) 346 for providing information to an operation center, which is communicably coupled to the RSU 130, regarding a position of the RSU 130. The GNSS 346 may be configured as a global positioning system (GPS).

The RSU 130 is also configured with a power over Ethernet (POE) device 352, which may be used to provide a wired source of electric power to the RSU 130. Additionally, the POE device 352 may provide a wired data connection, for example, between the RSU 130 and the operation center. The wired source of electric power provided by the POE device 352 may be used as a main power source for the RSU 130.

The RSU 130 may further be configured with a coin cell 348 and a wireless device 350. The wireless device 350 may be a DSRC Wi-Fi chipset, which may broadcast a preconfigured message, such as a TIM, to oncoming OBUs at a configured interval when powered, via the at least two radio interfaces, as briefly described in FIGS. 1A-2B and further described in FIGS. 4-5. In FIG. 3, the RSU 130 is depicted as being configured with one wireless device; however, other embodiments of the RSU 130 may include more than one wireless device. The wireless device 350 may be powered by the POE device 352 or by the coin cell 348. A coverage range of the wireless device 350 may be the same as a coverage range of the RSU 130, or may have a configured different coverage range. The coin cell 348 may be an alternate power source for the wireless device 350 and may provide power to the wireless device 350 when a main power source (e.g., POE device 352) might not be providing power to the wireless device 350.

The RSU 130 may communicate with in-vehicle computing system 309 wirelessly through external device interface 312 over a network 360, a USB connection, a direct wired connection, a direct wireless connection, and/or other communication link. For example, as described herein, the TIM may be sent to OBUs (e.g., in-vehicle computing systems) of vehicles over other wireless connection (e.g., cellular communication) in addition to or alternatively to direct communication with the RSU 130. For example, the TIM may be sent to OBUs from a cloud application. Three common communication mechanisms which may be used to transmit a TIM or other message containing information about lane parameters and HOV criteria for at least one HOV lane to an OBU of a vehicle include DSRC, CV2X, and cellular communication (e.g., 4G, 5G). In the example disclosed herein, the in-vehicle computing system 309 of vehicle 302 includes the OBU 334 which may connect the vehicle 302 to the RSU 130 via a DSRC/CV2X or other wireless communication medium. In such a connected system, data and messages among vehicles configured with OBUs and road infrastructure are exchanged with acceptable time delay. DSRC/CV2X enables communication between a vehicle and any DSRC/CV2X equipped object—e.g., vehicle-to-everything (V2X) communication- and provides a 360-degree field of view with long-range detection and communication capability, up to 1000 meters for DSRC and a few kilometers (e.g., approximately 5 kilometers) for CV2X.

In-vehicle computing system 309 may analyze the input received from the RSU 130, and/or other input sources and, using the OBU 334, generate and output notifications (e.g., the first notification and the second notification) indicating desirable movement into or out of an HOV lane. The notifications may be output via touch screen 308 and/or speakers. Additionally, in some examples, the vehicle control system 330 may perform other actions based on generation of each notification, such as implementing a vehicle merge protocol.

Inter-vehicle system communication module 322 may output data to one or more other vehicle systems 331 and/or one or more other vehicle control elements 361, while also receiving data input from other vehicle systems 331 and other vehicle control elements 361, e.g., by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, in-vehicle computing system 309 may retrieve from the engine CAN bus the current speed of the vehicle estimated by the wheel sensors, a power state of the vehicle via a battery and/or power distribution system of the vehicle, an ignition state of the vehicle, and so on. In addition, other interfacing means such as Ethernet may be used as well without departing from the scope of this disclosure.

A storage device 306 may be included in in-vehicle computing system 309 to store data such as instructions executable by operating system processor 314 and/or interface processor 320 in non-volatile form. Storage device 306 may store application data, including prerecorded sounds, to enable in-vehicle computing system 309 to run an application for connecting to a cloud-based server and/or collecting information for transmission to the cloud-based server. The application may retrieve information gathered by vehicle systems/sensors, input devices (e.g., the user interface 318), data stored in one or more storage devices, such as a memory 319, which may be a volatile memory or a non-volatile memory, devices in communication with the in-vehicle computing system (e.g., a mobile device connected via a Bluetooth® link), and so on. (Bluetooth® is a registered trademark of Bluetooth SIG, Inc., Kirkland, WA.) In-vehicle computing system 309 may further include the memory 319. For example, the memory 319 may be a volatile memory, such as random access memory (RAM). The memory 319 may additionally or alternatively include non-transitory storage devices, such as a non-volatile storage device 306 and/or non-volatile memory. The non-transitory storage devices may store instructions and/or code that, when executed by a processor (e.g., operating system processor 314 and/or interface processor 320), controls in-vehicle computing system 309 to perform one or more of the actions described in the disclosure. The memory 319 may further store BSMs, which may include vehicle characteristics such as the vehicle class type, which may be used by the method described with respect to FIG. 5 to determine an HOV lane eligibility of the vehicle 302.

One or more additional sensors may be included in a sensor subsystem 310 of in-vehicle computing system 309. For example, sensor subsystem 310 may include a camera, such as a rear view camera for assisting a user in parking the vehicle and/or a cabin camera for identifying a user (e.g., using facial recognition and/or user gestures). Sensor subsystem 310 of in-vehicle computing system 309 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so on.

While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 326 of in-vehicle computing system 309 may generate and/or receive navigation information such as location information (e.g., via a GPS sensor and/or other sensors from sensor subsystem 310), route guidance, traffic information, point-of-interest (POI) identification, and/or provide other navigational services for the driver.

Audio system 332 may include one or more acoustic reproduction devices including electromagnetic transducers such as one or more speakers 335. Vehicle audio system 332 may be passive or active such as by including a power amplifier. In some examples, in-vehicle computing system 309 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Vehicle control system 330 may also include controls for adjusting the settings of various vehicle control elements 361 (or vehicle controls, or vehicle system control elements) related to the engine and/or auxiliary elements within a cabin of the vehicle, such as one or more steering wheel controls 362 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on.

Vehicle control elements 361 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system. The control signals may also control audio output at one or more speakers 335 of vehicle audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, and so on.

The control elements of vehicle control system 330 may be physically and permanently positioned on and/or in the vehicle for receiving user input. In addition to receiving control instructions from in-vehicle computing system 309, vehicle control system 330 may also receive input from one or more external devices operated by the user, such as from a mobile device communicably coupled to the vehicle 302 (e.g., via a wired or wireless connection). This allows aspects of vehicle systems 331 and vehicle control elements 361 to be controlled based on user input received from external devices.

In-vehicle computing system 309 may further include one or more antennas 338. The in-vehicle computing system may obtain broadband wireless internet access via antennas 338, and may further receive broadcast signals such as radio, television, weather, traffic, and the like. In-vehicle computing system 309 may receive positioning signals such as GPS signals via antennas 338. The in-vehicle computing system may also receive wireless commands via radio frequency (RF) such as via antennas 338 or via infrared or other means through appropriate receiving devices. In some embodiments, antenna 338 may be included as part of audio system 332 or telecommunication system 336.

FIG. 4 describes a method for generating and broadcasting a TIM, which may be performed by the RSU 130 of FIG. 3. For example, the non-transitory memory 340 of the RSU 130 may store executable instructions that, when executed, cause the processor 344 to identify lane parameters and HOV criteria for an HOV lane, generate, in response to identification of lane parameters and HOV criteria, a TIM having a payload which indicates the lane parameters and HOV criteria, and broadcast the TIM over a wireless interface, such as the first radio 342a, the second radio 342b, and/or the wireless device 350. The TIM may be broadcast over a broadcasting range of the RSU 130, which may include a plurality of lanes, both non-HOV lanes and HOV lanes, such as the first series of lanes 110 of FIGS. 1A-2B.

At 402, the method 400 includes identifying lane parameters and HOV criteria. As described with respect to FIG. 3, the RSU 130 may include the memory 340 and/or may be communicably coupled to, via at least one of a wired or a wireless connection, an operation center including a database which stores lane parameters for a plurality of lanes of at least one roadway. For example, the memory 340 and/or database may store lane parameters of an HOV lane (e.g., the HOV lane 104), including coordinates of the HOV lane, a lane width, a heading of the HOV lane, and a validity time duration (e.g., a timeframe in which criteria of the HOV lane are active). The memory 340 and/or database may also store HOV criteria of the HOV lane, including a desired number of vehicle occupants in vehicles traveling in the HOV lane under different conditions and a vehicle class type which is HOV lane-eligible. An HOV lane may be identified and differentiated from other HOV lanes using 3D coordinates of the HOV lane (e.g., an HOV_TIM shapepoint), in some examples. Additionally or alternatively, an HOV lane may be identified by a name, numerical identifier, and/or alpha-numerical identifier. Thus, when an identifier of the HOV lane is called up by the processor 344, the herein described lane parameters and HOV criteria which correspond to the identifier are also called up from the memory 340 and/or database.

At 404, the method 400 includes generating a TIM payload for an HOV lane, where the TIM payload includes the lane parameters and HOV criteria identified at operation 402. Generating the TIM payload may include referring to a list of standard codes for HOV lanes, such as the ITIS codes or other regional standards, as described above. The list of standard codes may be stored on the RSU (e.g., the memory 340 of the RSU 130) and/or on the database of the operation center communicably coupled to the RSU 130. For each identified lane parameter and HOV criteria, the processor 344 may execute instructions directed to match the lane parameter or HOV criteria to a corresponding code (e.g., of the list of standard codes for HOV lanes) and to store the corresponding code as an element of the TIM payload. As described above, the codes may include an HOV lane indication (e.g., indicating the lane is an HOV lane), a validity time duration (e.g., a timeframe in which criteria of the HOV lane are active), and at least one of a code indicating that single occupancy vehicles are HOV lane-ineligible, a code indicating vehicles with less than three occupants are HOV lane-ineligible, and a code indicating that vehicles with less than X number of occupants are HOV lane-ineligible. X may be a configurable integer depending on other criteria, such as the validity time duration which indicates when the criteria are in effect. The heading of the HOV lane which indicates a direction of vehicle travel and the lane width indicating a width of the HOV lane may further be matched to corresponding codes, and the codes may be stored in the TIM payload. Additionally, configurable information regarding a number and frequency of HOV_TIM shapepoints may be included in the TIM payload. For example, a plurality of HOV_TIM shapepoints may be distributed at regular intervals along the length of the HOV lane, such as at intervals of 6 m, 10 m, or any other distance interval, as indicated by the TIM payload.

In this way, the TIM may include a payload comprised of HOV lane criteria which identify physical characteristics of the HOV lane (e.g., the HOV lane heading, and the HOV lane width) and criteria which are used to determine HOV lane eligibility of a vehicle (e.g., the message validity time duration, the desired number of occupants). The TIM may further include an RSU identifier used to identify the RSU generating and broadcasting the TIM, an intersection identifier used to identify an intersection of roadways, a three-dimensional location identifier used to identify a location, and a chosen distance between nodes (e.g., shapepointset/offsetXY), which may be used to broadcast the TIM across a range of the RSU 130.

At 406, the method 400 includes outputting the TIM. For example, the TIM may be broadcast by at least one of the wireless device 350, the first radio 342a, and the second radio 342b. The TIM may be broadcast at a configured interval or broadcast continuously when the wireless device 350 and/or the RSU 130 is powered. The TIM is thus broadcast to oncoming OBUs, including the OBU 334 of the vehicle 302 (e.g., the HV 102). A broadcasting range of the RSU 130 may include a 360-degree field of view and a long range detection and/or communication capability of up to 1000 meters, in some examples. The TIM may be broadcast continuously and/or periodically (e.g., one TIM broadcast per 5 seconds, one TIM broadcast per 7 seconds, and so on).

In this way, information about an HOV lane (e.g., the HOV lane 104) is presented/transmitted to OBUs in a single dataset, and decreased processing/memory may be used compared to transmitting each lane parameter and/or HOV criteria to the OBU as a single entity. A first RSU (e.g., the RSU 130) may broadcast a plurality of different TIMs for different regions and/or different RSUs may broadcast a TIM for a given region with multiple RSUs positioned along the HOV lane. Additionally, a plurality of TIMs, some of which include information about at least one HOV lane and some of which do not, may be broadcast by the same RSU.

As described above, an OBU of a vehicle (e.g., the OBU 334 of the vehicle 302) may receive a TIM when entering a roadway having an RSU (e.g., the RSU 130). FIG. 5 describes a method for receiving a TIM (e.g., the TIM broadcast by the RSU 130, as described with respect to FIG. 4) and using information of the TIM to generate and output notifications indicating vehicle HOV lane eligibility and vehicle position. A method 500 of FIG. 5 may be implemented by the in-vehicle computing system 309 of the vehicle 302 of FIG. 3. For example, the memory 319 may store executable instructions that, when executed, cause the OBU 334 to evaluate a TIM received from the RSU 130 via the external device interface 312, compare vehicle characteristics (e.g., stored in the memory 319 and/or identified by sensors of the vehicle 302) to HOV criteria included in the TIM payload, and determine if the vehicle is in the HOV lane. In response to the OBU determining that the vehicle is in the HOV lane and the vehicle is HOV lane-ineligible, the OBU generates and outputs a first notification indicating that it is desirable to move out of the HOV lane. In response to the OBU determining that the vehicle is not in the HOV lane (e.g., is in a non-HOV lane) and the vehicle is HOV lane-eligible, the OBU generates and outputs a second notification indicating that it is desirable to move into the HOV lane. In this way, an eligibility or ineligibility of a vehicle to travel in an HOV lane may be simply and quickly determined without ambiguity which may be present when HOV lane criteria are variable, for example, due to changes in traffic patterns, among different regions, and so on.

At 502, the method 500 includes receiving and evaluating a TIM. As described with respect to FIG. 4, the TIM may be output by the RSU 130 and broadcast by at least one of the wireless device 350, the first radio 342a, and the second radio 342b of the RSU 130. When entering a broadcast range of the RSU 130, the in-vehicle computing system 309 may wirelessly connect with the RSU 130 via the external device interface 312 of the vehicle 302, and the vehicle 302 may receive the TIM. The OBU may evaluate the TIM to determine if the TIM includes information (e.g., codes) related to an HOV lane. As described above, the TIM includes a TIM payload having codes which indicate lane parameters and HOV criteria of the HOV lane. Evaluating the TIM may include matching each code of the TIM payload to a dictionary of code definitions which is stored in the memory 319 of the vehicle 302, for example. Alternatively, each code of the TIM payload may be coupled to an action or step of the executable instructions stored on the memory 319, such that the instructions may be executed without first translating the code to the respective definition.

At 504, the method 500 includes determining if the TIM includes an HOV code. For example, the TIM payload may include at an HOV lane indication, such as a region type code and/or a lane type code, which identifies the TIM payload as including information for an HOV lane. If it is determined that an HOV code is not included in the TIM, then the TIM may not include information for an HOV lane, and the method 500 for using TIM information to determine HOV lane eligibility of a vehicle ends.

If it is determined at 504 that the TIM includes an HOV code (e.g., the TIM includes information about lane parameters and HOV criteria of an HOV lane), at 506, the method 500 includes identifying a vehicle class type. As described above, a vehicle may be HOV lane-eligible based on the vehicle class type and without evaluation of a number of occupants of the vehicle. For example, the TIM payload may include a code indicating that vehicles with a vehicle class type of public utility vehicles such as emergency response vehicles (e.g., police, fire, ambulance, paratransit, et cetera) or transit buses (e.g., school bus, local bus, express bus, et cetera) qualify as HOV lane-eligible. Vehicles with a vehicle class type other than public utility vehicles or transit buses may not qualify as HOV lane-eligible, and further vehicle characteristics may be evaluated to determine if the vehicle is HOV lane-eligible.

At 508, the method 500 includes determining if the vehicle class type of the vehicle is HOV-qualifying, as indicated by the TIM payload. If the vehicle class type of the vehicle is HOV-qualifying, the method 500 proceeds to operation 516 to evaluate a vehicle lane position (e.g., relative to the HOV lane). Further detail regarding operation 516 is described below.

If the vehicle class type of the vehicle is not HOV-qualifying, the method 500 proceeds to 510 to evaluate the vehicle occupancy. In some examples, a weight held by a seat of the vehicle and/or engagement of a seat belt of a seat of the vehicle may indicate a presence of a vehicle occupant. For example, the number of occupants of the vehicle may be determined using one or more seat-mounted pressure sensors configured to measure the pressure applied to a seat of the vehicle to determine the presence of a user, and/or one or more seat-mounted clip-in sensors to detect when a first end of a belt is clipped into a belt receiver of a seat of the vehicle to determine the presence of a user. In other examples, a number of occupants may be entered into the memory 319 of the vehicle via the user interface 318. In still other examples, a number of occupants may be determined using other systems and methods, such as cameras of the sensor subsystem 310 mounted in a cabin of the vehicle used to identify a number of occupants in the vehicle, regardless of clip-in belt engagement and/or occupant weight.

At 512, the method 500 includes comparing the vehicle occupancy to HOV criteria included in the TIM payload. For example, the TIM payload may include at least one of a code indicating that single occupancy vehicles are HOV lane-ineligible, a code indicating vehicles with less than three occupants are HOV lane-ineligible, and a code indicating that vehicles with less than X number of occupants are HOV lane-ineligible, where X may be a configurable integer. A number of occupants which indicate the vehicle is HOV lane-eligible, and the corresponding code stored in the TIM to be used to determine if the vehicle meets HOV criteria, may in some examples be different during different times of the day, week, and year. For example, the TIM payload may include a code indicating a validity time duration (e.g., a timeframe in which criteria of the HOV lane are active). The OBU of the vehicle may evaluate a time of day in which the vehicle is operating (e.g., via the navigation subsystem 326, interface processor 320, or other timekeeping elements of the in-vehicle computing system 309), and compare the time to the validity time duration of the TIM payload to identify a number of occupants which may fulfill the HOV criteria.

At 514, the method 500 includes determining if the HOV criteria are met by the vehicle characteristics. For example, if the TIM payload includes a code indicating vehicles with less than three occupants are HOV lane-ineligible between 6 a.m. and 9 a.m., and the OBU determines the vehicle has four occupants at 7:30 a.m., the vehicle may be HOV lane-eligible. If the TIM payload includes the code indicating vehicles with less than three occupants are HOV lane-ineligible between 6 a.m. and 9 a.m., and the OBU determines the vehicle has two occupants at 7:30 a.m., the vehicle may be HOV lane-ineligible.

If at 514 it is determined that the vehicle is HOV lane-eligible, either by the HOV criteria being met by the vehicle characteristics or the vehicle class type being HOV-qualifying, the method 500 proceeds to 516 to evaluate a vehicle lane position. The vehicle lane position may be determined using location information from a GPS sensor of the vehicle. The vehicle, which is HOV lane-eligible, may be traveling in the HOV lane for which it qualifies (e.g., as shown in the first scenario 100 of FIG. 1A) or may not be traveling in the HOV lane for which it qualifies (e.g., as shown in the fourth scenario 250 of FIG. 2B). If, at 518, it is determined that the vehicle is not traveling in the HOV lane for which it qualifies, at 500, the method 520 includes generating and outputting the second notification indicating that it is desirable to move to the HOV lane. Moving to the HOV lane when the vehicle is HOV lane-eligible may decrease a travel time and increase a fuel efficiency, compared to traveling in a non-HOV lane. If, at 518 it is determined that the vehicle is traveling in the HOV lane for which it qualifies, the method 500 may end, as the vehicle may already be traveling in the lane which proves the shortest travel time and/or greatest fuel efficiency.

Returning to operation 514, if it is determined that HOV criteria are not met by the vehicle characteristics (e.g., the number of vehicle occupants is less than the number of occupants indicated in the HOV criteria), the vehicle may be HOV lane-ineligible. The method proceeds to 522, where the method 500 includes evaluating the vehicle lane position. The vehicle lane position may be determined using location information from a GPS sensor of the vehicle. The vehicle, which is HOV lane-ineligible, may appropriately not be traveling in the HOV lane (e.g., may be traveling in a non-HOV lane, as shown in the second scenario 150 of FIG. 1B). If, at 524 it is determined that the vehicle is not in the HOV lane, the method 500 may end, as the vehicle may already be traveling in the lane for which it is eligible. Alternatively, the vehicle which is HOV lane-ineligible may be traveling in the HOV lane (e.g., as shown in the third scenario 200 of FIG. 2A). If, at 524, it is determined that the vehicle is traveling in the HOV lane, for which it does not qualify, at 526, the method 500 may include generating and outputting the first notification indicating that it is desirable to move out of the HOV lane. The method 500 ends.

In some embodiments, a MAP message may be used in addition to or alternatively to a TIM to store and transmit information about an HOV lane. A MAP message may include a topological definition of lanes within an intersection and/or for a roadway having a series of lanes (e.g., as shown in FIGS. 1A-2B), including types of lanes and conditions for use of each lane. For example, the MAP message may include lane parameters and HOV criteria, as described herein, for at least one HOV lane of the series of lanes to which the MAP message refers.

The MAP message may be transmitted similarly to the TIM as described herein. In some examples, a RSU may identify lane parameters and HOV criteria of an HOV lane, generate a MAP message including codes indicating one or more lane parameters and one or more HOV criteria of the HOV lane, and transmit the MAP message for OBUs of vehicles in a broadcast range of the RSU. In some examples, a plurality of MAP messages may be defined wherein each MAP message includes one or more HOV criteria of one of more HOV lanes, and a RSU may output one or more MAP message.

An OBU of a vehicle may receive the MAP message from a RSU, determine if information stored in the MAP message includes codes indicating parameters of a HOV lane, and determine if the vehicle is HOV-eligible by comparing lane parameters and HOV criteria of the HOV lane indicated by the MAP message to vehicle characteristics stored in a memory of the vehicle. The OBU of the vehicle further evaluates a lane position of the vehicle with respect to the HOV lane. When the vehicle is HOV lane-ineligible and the vehicle is in the HOV lane the OBU generates and outputs a first notification indicating it is desirable to move out of the HOV lane. When the vehicle is HOV lane-eligible and is not in the HOV lane, the OBU generates and outputs a second notification, different from the first notification, the second notification indicating it is desirable to move into the HOV lane.

Messages (e.g., the TIM, the MAP message) transmitted by the RSU for OBUs of vehicles in the broadcast range of the RSU may be time-based, such that the message indicates a time in which the lane parameters and HOV criteria stored in the message are eligible. For example, as described with respect to FIG. 2A, a vehicle may be traveling in an HOV lane when the vehicle is HOV lane-ineligible, however eligibility of the vehicle may change while the vehicle is in the HOV lane. The message may include validity time duration which indicates when the HOV criteria are in effect, such as between certain hours (e.g., 6 a.m. to 9 a.m.). The OBU of the vehicle may compare the validity time duration to a current time (e.g., using a clock of the vehicle and/or a device communicably coupled to the vehicle via a wired and/or a wireless connection). The OBU may determine that the vehicle, which is HOV lane-ineligible and traveling in the HOV lane at the current time, will become HOV lane-eligible within the near future and, as a result, may not generate and output a notification indicating that it is desirable to move out of the HOV lane. For example, "the near future" may be within one minute, within two minutes, and so on, such that the OBU would generate and output a notification indicating that it is desirable to move into the HOV lane within minutes of the OBU generating and outputting the notification indicating it is desirable to move out of the HOV lane. The vehicle may become HOV lane-eligible due to a change in HOV lane criteria, for example, a change in a minimum desired number of occupants from a first timeframe to a second timeframe, where the minimum desired number of occupants changes from three to two, and the vehicle has two occupants. In some examples, the OBU may generate and output a notification indicating that the vehicle may become HOV lane-eligible in the near future. For example, a notification may be output for display on a display device of the vehicle that includes text "HOV lane-eligible in two minutes". Notifying a user (e.g., a driver) and/or a controller of the vehicle that movement out of the HOV lane, regardless of HOV lane eligibility at the current time is not desired may help reduce fuel consumption which is used when moving out of and back into the HOV lane within a short time span (e.g., within minutes).

Similarly, a vehicle which is HOV lane-eligible and traveling in a non-HOV lane may not receive a notification indicating that it is desirable to move to the HOV lane due to the vehicle becoming HOV lane-ineligible in the near future. For example, as described above, the message received by the OBU of the vehicle may include a validity time duration which indicates when the criteria are in effect, such as between certain hours (e.g., 6 a.m. to 9 a.m.). The OBU of the vehicle may compare the validity time duration to a current time and determine that the vehicle, which is HOV lane-eligible and traveling in the non-HOV lane at the current time, will become HOV lane-ineligible within the near future. As a result, the OBU may not generate and output a notification indicating that it is desirable to move into the HOV lane. For example, "the near future" may be within one minute, within two minutes, and so on, such that the OBU would generate and output a notification indicating that it is desirable to move out of the HOV lane within minutes of the OBU generating and outputting the notification indicating it is desirable to move into the HOV lane. The vehicle may become HOV lane-ineligible due to a change in HOV lane criteria, for example, a change in a minimum desired number of occupants from a first timeframe to a second timeframe, where the minimum desired number of occupants changes from two to three, and the vehicle has two occupants. In some examples, the OBU may generate and output a notification indicating that the vehicle may become HOV lane-ineligible in the near future. For example, a notification may be output for display on a display device of the vehicle that includes text "HOV lane-ineligible in two minutes". Notifying a user (e.g., a driver) and/or a controller of the vehicle that movement into the HOV lane, regardless of HOV lane eligibility at the current time is not desired may help reduce fuel consumption which is used when moving out of and back into the HOV lane within a short time span (e.g., within minutes).

Traveling in the HOV lane when not qualifying for the HOV lane may be a traffic rule violation and may result in a citation and/or fine. Additionally, traveling in a non-HOV lane when qualifying for the HOV lane may increase a travel time and/or fuel use compared to traveling in the HOV lane. While it may be desirable to travel in the lane for which a vehicle qualifies, HOV criteria for HOV lanes may vary among different roadways, regions, states, and so on. Further, HOV criteria for a single HOV lane may vary depending on traffic patterns, time of day, and so on. Disclosed herein are systems and methods which may allow for quick, simple, timely, and accurate identification of whether or not a vehicle is traveling in a lane for which it qualifies.

The disclosure also provides support for a method for an on board unit (OBU) of a vehicle, comprising: receiving a traveler information message (TIM) from a roadside unit (RSU), determining if a payload of the TIM includes codes indicating parameters of a high occupancy vehicle (HOV) lane, determining if the vehicle is HOV-eligible by comparing lane parameters and HOV criteria of the HOV lane indicated by the TIM to vehicle characteristics stored in a memory of the vehicle, evaluating a lane position of the vehicle with respect to the HOV lane, when the vehicle is HOV lane-ineligible and the vehicle is in the HOV lane, generating and outputting a first notification indicating it is desirable to move out of the HOV lane, and when the vehicle is HOV lane-eligible and is not in the HOV lane, generating and outputting a second notification, different from the first notification, the second notification indicating it is desirable to move into the HOV lane. In a first example of the method, the TIM is transmitted to the OBU over a wireless connection, cellular communication, DSRC, and/or CV2X. In a second example of the method, optionally including the first example, outputting each of the first notification and the second notification includes outputting for display on a display device at least one of a visual indicator, a text, a light, and a symbol, wherein a display of the first notification is different from a display of the second notification. In a third example of the method, optionally including one or both of the first and second examples, the codes included in the payload of the TIM indicate at least one of a lane type, a direction of the HOV lane, a heading of the HOV lane, a lane width, a validity time duration, a minimum passenger occupancy, and a distance between two nodes. In a fourth example of the method, optionally including one or more or each of the first through third examples, the method further comprises: determining a current time and comparing the current time to the validity time duration prior to generating and outputting the first notification and prior to generating and outputting the second notification. In a fifth example of the method, optionally including one or more or each of the first through fourth examples, the vehicle characteristics include a direction of the vehicle, a heading of the vehicle, a passenger occupancy number, and a vehicle class type. In a sixth example of the method, optionally including one or more or each of the first through fifth examples, the vehicle is determined to be HOV-eligible when a vehicle class type of the vehicle corresponds to an eligible vehicle class type indicated by the TIM. In a seventh example of the method, optionally including one or more or each of the first through sixth examples, the vehicle is determined to be HOV-eligible when a number of occupants of the vehicle is equal to or greater than a desired number of occupants indicated by the TIM. In an eighth example of the method, optionally including one or more or each of the first through seventh examples, the number of occupants of the vehicle is determined by at least one of: a seat-mounted clip-in sensor, and a seat-mounted pressure sensor. In a ninth example of the method, optionally including one or more or each of the first through eighth examples, determining if the payload of the TIM includes codes indicating parameters of the HOV lane includes matching each code of the payload of the TIM to a dictionary of code definitions which is stored in the memory of the vehicle. In a tenth example of the method, optionally including one or more or each of the first through ninth examples, determining if the payload of the TIM includes codes indicating parameters of the HOV lane includes identifying at least one of: a region type of the payload of the TIM, and a lane type of the payload of the TIM. In an eleventh example of the method, optionally including one or more or each of the first through tenth examples, the lane position of the vehicle is determined using location information from a GPS sensor of the vehicle.

The disclosure also provides support for a method for a roadside unit (RSU), comprising: identifying lane parameters and high occupancy vehicle (HOV) criteria of an HOV lane, generating a traveler information message (TIM) including codes indicating one or more lane parameters and one or more HOV criteria of the HOV lane, and transmitting the TIM for on board units (OBU) of vehicles in a broadcast range of the RSU. In a first example of the method, identifying the one or more HOV criteria and the one or more lane parameters of the HOV lane includes identifying the HOV lane and corresponding information in at least one of: a memory of the RSU, and a database communicably coupled to the RSU. In a second example of the method, optionally including the first example, the one or more HOV criteria include a desired number of occupants of a vehicle and a vehicle class type of the vehicle. In a third example of the method, optionally including one or both of the first and second examples, the one or more lane parameters include at least one of a lane type, a heading of the HOV lane, a lane width, a validity time duration, a minimum passenger occupancy, and a distance between two nodes. In a fourth example of the method, optionally including one or more or each of the first through third examples, the one or more lane parameters and the one or more HOV criteria of the HOV lane are stored in a payload of the TIM as standardized codes. In a fifth example of the method, optionally including one or more or each of the first through fourth examples, the TIM is transmitted by the RSU to the OBU via cloud services when the OBU enters the broadcast range of the RSU.

The disclosure also provides support for a system for a vehicle, comprising: a user interface, an external device interface configured to wirelessly receive traveler information messages (TIMs) broadcast by a roadside unit (RSU), an on board unit (OBU) having one or more processors, and a non-transitory memory storing executable instructions that, when executed, cause the one or more processors to: evaluate a TIM received by the system, determine if the vehicle is eligible to travel in an HOV lane by comparing characteristics of the vehicle to one or more HOV lane criteria stored in the TIM, determine a location of the vehicle relative to the HOV lane, responsive to determining the vehicle is HOV lane-ineligible and the vehicle is positioned in the HOV lane, generating and outputting a first notification indicating that it is desirable to move out of the HOV lane, and responsive to determining the vehicle is HOV lane-eligible and the vehicle is not positioned in the HOV lane, generating and outputting a second notification indicating that it is desirable to move into the HOV lane. In a first example of the system, the RSU comprises: at least one wireless device for signal broadcasting, one or more processors, a wireless interface configured to transmit TIMs to OBUs, and a non-transitory memory having executable instructions that, when executed, cause the one or more processors to: detect parameters of a lane, generate, in response to detection of parameters of the lane, the TIM having a payload which indicates the parameters of the lane, and broadcast the TIM over the wireless interface.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, hardware network interfaces/antennas, switches, actuators, clock circuits, et cetera. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," et cetera are used merely as labels, and are not intended to impose numerical requirements or a particular positional order on their objects. The following claims particularly point out subject matter from the above disclosure that is regarded as novel and non-obvious.

The invention claimed is:

1. A method for an on board unit (OBU) of a vehicle, comprising:
   receiving a traveler information message (TIM) from a roadside unit (RSU), within a broadcast range of the RSU, wherein the broadcast range of the RSU includes a high occupancy vehicle (HOV) lane;
   determining that a payload of the TIM includes codes indicating parameters of the HOV lane;
   determining that the vehicle is HOV-eligible by comparing lane parameters and HOV criteria of the HOV lane indicated by the TIM to vehicle characteristics stored in a memory of the vehicle;
   evaluating a lane position of the vehicle with respect to the HOV lane;
   when the vehicle is HOV lane-ineligible and the vehicle is in the HOV lane, generating and outputting a first notification indicating it is desirable to move out of the HOV lane; and
   when the vehicle is HOV lane-eligible and is not in the HOV lane, generating and outputting a second notification, different from the first notification, the second notification indicating it is desirable to move into the HOV lane.

2. The method of claim 1, wherein the TIM is transmitted to the OBU over a wireless connection, cellular communication, DSRC, and/or CV2X.

3. The method of claim 1, wherein outputting each of the first notification and the second notification includes outputting for display on a display device at least one of a visual indicator, a text, a light, and a symbol, wherein a display of the first notification is different from a display of the second notification.

4. The method of claim 1, wherein the codes included in the payload of the TIM indicate at least one of a lane type, a direction of the HOV lane, a heading of the HOV lane, a lane width, a validity time duration, a minimum passenger occupancy, and a distance between two nodes.

5. The method of claim 4, further comprising determining a current time and comparing the current time to the validity time duration prior to generating and outputting the first notification and prior to generating and outputting the second notification.

6. The method of claim 1, wherein the vehicle characteristics include a direction of the vehicle, a heading of the vehicle, a passenger occupancy number, and a vehicle class type.

7. The method of claim 1, wherein the vehicle is determined to be HOV-eligible when a vehicle class type of the vehicle corresponds to an eligible vehicle class type indicated by the TIM.

8. The method of claim 1, wherein the vehicle is determined to be HOV-eligible when a number of occupants of the vehicle is equal to or greater than a desired number of occupants indicated by the TIM.

9. The method of claim 8, wherein the number of occupants of the vehicle is determined by at least one of: a seat-mounted clip-in sensor, and a seat-mounted pressure sensor.

10. The method of claim 1, wherein determining that the payload of the TIM includes codes indicating parameters of the HOV lane includes matching each code of the payload of the TIM to a dictionary of code definitions which is stored in the memory of the vehicle.

11. The method of claim 1, wherein determining that the payload of the TIM includes codes indicating parameters of the HOV lane includes identifying at least one of: a region type of the payload of the TIM; and a lane type of the payload of the TIM.

12. The method of claim 1, wherein the lane position of the vehicle is determined using location information from a GPS sensor of the vehicle.

13. A method, comprising:
  identifying lane parameters and high occupancy vehicle (HOV) criteria of an HOV lane of a roadway within a broadcast range of a roadside unit (RSU), the RSU comprising at least one wireless device for signal broadcasting, one or more additional processors, a wireless interface configured to transmit traveler information messages (TIMs) to on board units (OBUs), and a non-transitory memory having executable instructions that, when executed, cause the one or more additional processors to:
  detect parameters of a lane;
  generate a TIM including codes indicating one or more lane parameters and one or more HOV criteria of the HOV lane; and
  transmit the TIM for OBUs of vehicles in the broadcast range of the RSU,
  wherein the TIM is transmitted by the RSU to an OBU of the OBUs when the OBU enters the broadcast range of the RSU, the OBU comprising one or more processors and a non-transitory memory storing executable instructions that, when executed, cause the one or more processors to:
    evaluate a TIM received by the OBU;
    determine an eligibility of the vehicle to travel in the HOV lane;
    in response to determining the vehicle is ineligible to travel in the HOV lane, generating and outputting a first notification indicating HOV lane ineligibility; and
    in response to determining the vehicle is eligible to travel in the HOV lane, generating and outputting a second notification indicating HOV lane eligibility.

14. The method of claim 13, wherein identifying the one or more HOV criteria and the one or more lane parameters of the HOV lane includes identifying the HOV lane and corresponding information in at least one of: a memory of the RSU; and a database communicably coupled to the RSU.

15. The method of claim 13, wherein the one or more HOV criteria include a desired number of occupants of the vehicle and a vehicle class type of the vehicle.

16. The method of claim 13, wherein the one or more lane parameters include at least one of a lane type, a heading of the HOV lane, a lane width, a validity time duration, a minimum passenger occupancy, and a distance between two nodes.

17. The method of claim 13, wherein the one or more lane parameters and the one or more HOV criteria of the HOV lane are stored in a payload of the TIM as standardized codes.

18. The method of claim 13, wherein the TIM is transmitted by the RSU to the OBU via cloud services.

19. A system for a vehicle, comprising:
  a user interface;
  an external device interface configured to wirelessly receive traveler information messages (TIMs) broadcast by a roadside unit (RSU);
  an on board unit (OBU) having one or more processors; and
  a non-transitory memory storing executable instructions that, when executed, cause the one or more processors to:
    evaluate a TIM received by the system, the TIM including coordinates of a plurality of shapepoints distributed along a length of an HOV lane;
    determine whether the vehicle is eligible to travel in the HOV lane or is ineligible to travel in the HOV lane by comparing characteristics of the vehicle to one or more HOV lane criteria stored in the TIM;
    determine whether the vehicle is positioned in the HOV lane by detecting that the vehicle has passed through coordinates of at least one shapepoint of the HOV lane, or is not positioned in the HOV lane by detecting that the vehicle has not passed through coordinates of at least one shapepoint of the HOV lane;
    responsive to determining the vehicle is ineligible to travel in the HOV lane and the vehicle is positioned in the HOV lane, generating and outputting a first notification indicating that it is desirable to move out of the HOV lane; and
    responsive to determining the vehicle is eligible to travel in the HOV lane and the vehicle is not positioned in the HOV lane, generating and outputting a second notification indicating that it is desirable to move into the HOV lane.

20. The system of claim 19, wherein the RSU comprises:
  at least one wireless device for signal broadcasting;
  one or more additional processors;
  a wireless interface configured to transmit TIMs to OBUs; and
  an additional non-transitory memory having executable instructions that, when executed, cause the one or more additional processors to:
    detect parameters of a lane,
    generate, in response to detection of parameters of the lane, the TIM having a payload which indicates the parameters of the lane, and
    broadcast the TIM over the wireless interface.

* * * * *